(12) United States Patent
Maaβ et al.

(10) Patent No.: US 8,051,606 B2
(45) Date of Patent: Nov. 8, 2011

(54) SEALING OR GUIDING ASSEMBLIES AND METHOD OF MAKING IT

(75) Inventors: Klaus Peter Maaβ, Viersen (DE); Norbert Heller, Viersen (DE)

(73) Assignee: Henniges Automotive Sealing Systems North America, Inc., Farmington Hills, MI (US)

(*) Notice: Subject to any disclaimer, the term of this patent is extended or adjusted under 35 U.S.C. 154(b) by 944 days.

(21) Appl. No.: 11/718,215

(22) PCT Filed: Oct. 21, 2005

(86) PCT No.: PCT/IB2005/003322
§ 371 (c)(1),
(2), (4) Date: Jan. 24, 2008

(87) PCT Pub. No.: WO2006/046133
PCT Pub. Date: May 4, 2006

(65) Prior Publication Data
US 2009/0021044 A1    Jan. 22, 2009

(30) Foreign Application Priority Data

| Oct. 27, 2004 | (GB) | 0423875.4 |
| Dec. 2, 2004 | (GB) | 0426553.4 |
| Dec. 13, 2004 | (GB) | 0427261.3 |
| Apr. 4, 2005 | (GB) | 0506821.8 |

(51) Int. Cl.
*E06B 7/16* (2006.01)
(52) U.S. Cl. ................................ 49/479.1
(58) Field of Classification Search ........... 49/475.1, 49/479.1, 498.1, 495.1, 490.1
See application file for complete search history.

(56) References Cited

U.S. PATENT DOCUMENTS

| 5,463,832 | A | * | 11/1995 | Eckart | 49/479.1 |
| 5,699,603 | A | | 12/1997 | Backes et al. | |
| 5,839,232 | A | | 11/1998 | Backes et al. | |
| 6,240,677 | B1 | | 6/2001 | Baumann | |
| 6,598,348 | B2 | * | 7/2003 | Palicki | 49/479.1 |
| 6,725,605 | B2 | * | 4/2004 | Schlachter et al. | 49/479.1 |
| 6,996,936 | B1 | * | 2/2006 | Maass | 49/479.1 |

(Continued)

FOREIGN PATENT DOCUMENTS

| EP | 0799735 | 10/1997 |
| GB | 2393751 | 4/2004 |

(Continued)

*Primary Examiner* — Jerry Redman
(74) *Attorney, Agent, or Firm* — Howard & Howard Attorneys PLLC

(57) ABSTRACT

A sealing or guiding assembly for sealing or guiding a corner of a closure member such as a window (109) for an opening is disclosed. The sealing or guiding assembly is attached to a frame (8) comprising panels (22,24). Strips (91) of flexible material extend towards and meet at the apex of the corner and are shaped to receive the closure member (109) at the corner and are adapted to be supported by a corner support which forms part of the frame (8). A flap (170) of flexible material is joined to the strips (91) in the region of the corner and bridges across the corner between the strips (91). The strips include inner lip (102) and outer lip (103). The joins (160) and (162) between the molded flap (170) and the (preferably extruded) material of the strips (91) is obscured from view by the lips (102) and (103).

25 Claims, 23 Drawing Sheets

U.S. PATENT DOCUMENTS

| | | | |
|---|---|---|---|
| 7,650,718 B2 * | 1/2010 | Eguchi et al. | 49/479.1 |
| 2002/0139054 A1 * | 10/2002 | Schlachter et al. | 49/479.1 |
| 2004/0216384 A1 * | 11/2004 | Teramoto et al. | 49/479.1 |
| 2010/0126077 A1 * | 5/2010 | Eguchi et al. | 49/479.1 |

FOREIGN PATENT DOCUMENTS

| | | |
|---|---|---|
| WO | 03/070499 | 8/2003 |
| WO | 2004/050408 | 6/2004 |

* cited by examiner

SEALING OR GUIDING ASSEMBLIES AND METHOD OF MAKING IT

TECHNICAL FIELD

The invention relates to sealing or guiding assemblies and methods of making them. Embodiments of the invention, to be described in more detail below, are window sealing and guiding strip assemblies for use in motor vehicle body construction and, in particular, for use in window frames forming the upper part of vehicle doors, the sealing or guiding strip assembly being attached to the window frame and supporting the edge of a window pane which can be raised from and lowered into the lower part of the door. However, the invention is not restricted to such applications.

SUMMARY OF THE INVENTION

According to one aspect of the present invention, there is provided a sealing or guiding assembly for sealing or guiding a corner of a closure member for an opening and for attachment to a frame for the opening, including strips of flexible material extending towards and meeting at the apex of the corner and shaped to receive the closure member at the corner and adapted to be supported by a corner support which forms part of the frame, and a flap of flexible material joined to the strips of flexible material in the region of the corner and bridging across the corner between the strips, wherein the strips include at least one lip for sealingly engaging the closure member, the arrangement being such that the lips at least partially obscure from view the join between the flap and strips.

According to another aspect of the present invention, there is provided a method of sealing or guiding a corner of a closure member for an opening having a frame, the method including arranging strips of flexible material to extend towards and meet at the apex of the corner and having a configuration to receive the closure member at the corner and adapted to be supported by a corner support which forms part of the frame; and joining a flap of flexible material to the strips of flexible material in the region of the corner to bridge across the corner between the strips, wherein the strips include at least one lip for sealingly engaging the closure member, the arrangement being such that the lips at least partially obscure from view the join between the flap and strips.

According to a further aspect of the invention, there is provided a sealing or guiding assembly for sealing or guiding a corner of a closure member for an opening and for attachment to a frame for the opening, including strips of flexible material extending towards and meeting at the apex of the corner and shaped to receive the closure member at the corner and adapted to be supported by a corner support which forms part of the frame, and a flap of flexible material joined to the strips of flexible material in the region of the corner and bridging across the corner between the strips, wherein at least one of the strips includes a first lip that extends towards the apex of the corner and a second lip extending from the end region of the flap of flexible material that bridges across the corner between the strips, the lips being for sealingly engaging the closure member.

According to yet a further aspect of the invention, there is provided a sealing or guiding assembly for sealing or guiding a corner of a closure member for an opening and for attachment to a frame for the opening, including strips of flexible material extending towards and meeting at the apex of the corner and shaped to receive the closure member at the corner and adapted to be supported by a corner support which forms part of the frame, and a flap of flexible material joined to the strips of flexible material in the region of the corner and bridging across the corner between the strips, wherein the at least one of the strips includes at least one lip extending from the end region of the flap of flexible material that bridges across the corner between the strips for sealingly engaging the closure member.

BRIEF DESCRIPTION OF THE DRAWINGS

For a better understanding of the invention, window sealing and guiding strips embodying the invention and methods of making such strips will now be described, by way of example only, with reference to the accompanying diagrammatic drawings in which.

In the drawings, like elements are generally designated with the same reference numeral.

DETAILED DESCRIPTION OF EMBODIMENTS

Figure 1:
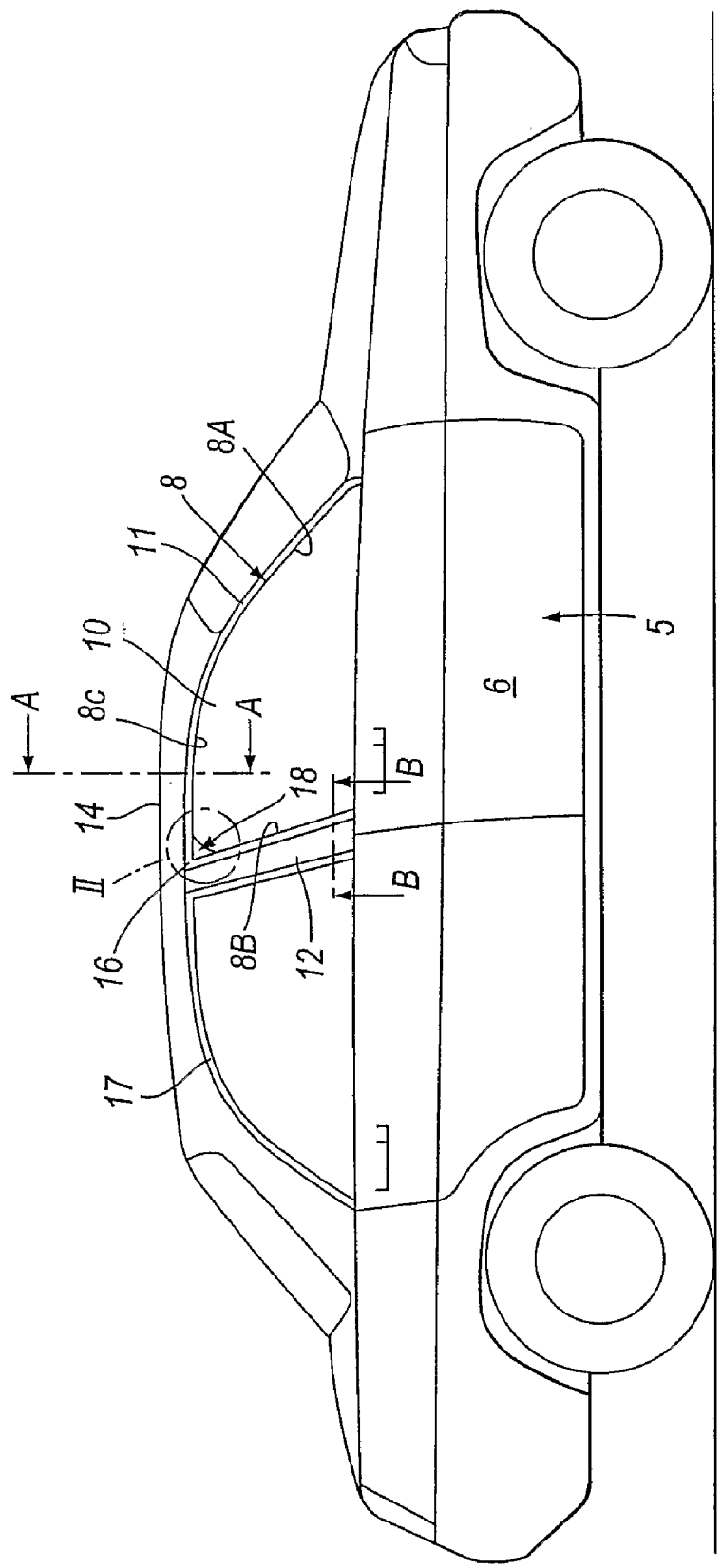
FIG. 1 is a side view of a motor vehicle body.

FIG. 1 shows the side of a motor vehicle body having a door 5 with a lower part 6 carrying a window frame indicated diagrammatically at 8 for a window opening 10. In the usual way, a window glass for the opening 10 can be raised from and lowered into the lower part 6 of the door. The frame 8 carries the sealing and guiding strip (not visible in FIG. 1) which will be described in more detail below.

The frame 8 comprises a part 8A along the sloping front of the door which is alongside the so-called "A" pillar 11 of the vehicle body, a generally vertical part 8B alongside the so-called "B" pillar 12 of the vehicle body, and a part 8C running along the top of the door generally parallel to the roofline.

Where the "B" pillar 12 meets the roof 14 of the vehicle, a sharp angle (substantially 90°) is formed, at 16. In a manner to be explained below, the sealing and guiding strip assembly to be described combines with the frame 8 to form a corresponding sharp angle 18 of the frame for receiving the matching angle of the window glass.

Although the embodiment relates to the corner of the "B" pillar it should be understood that the invention equally applies to any other corner—for example the corner 17 where the "C" pillar meets the roof 14. The corner does not have to have a "sharp angle"—the angle may be substantially less than 90° but will generally be at least 45°.

Figure 2:
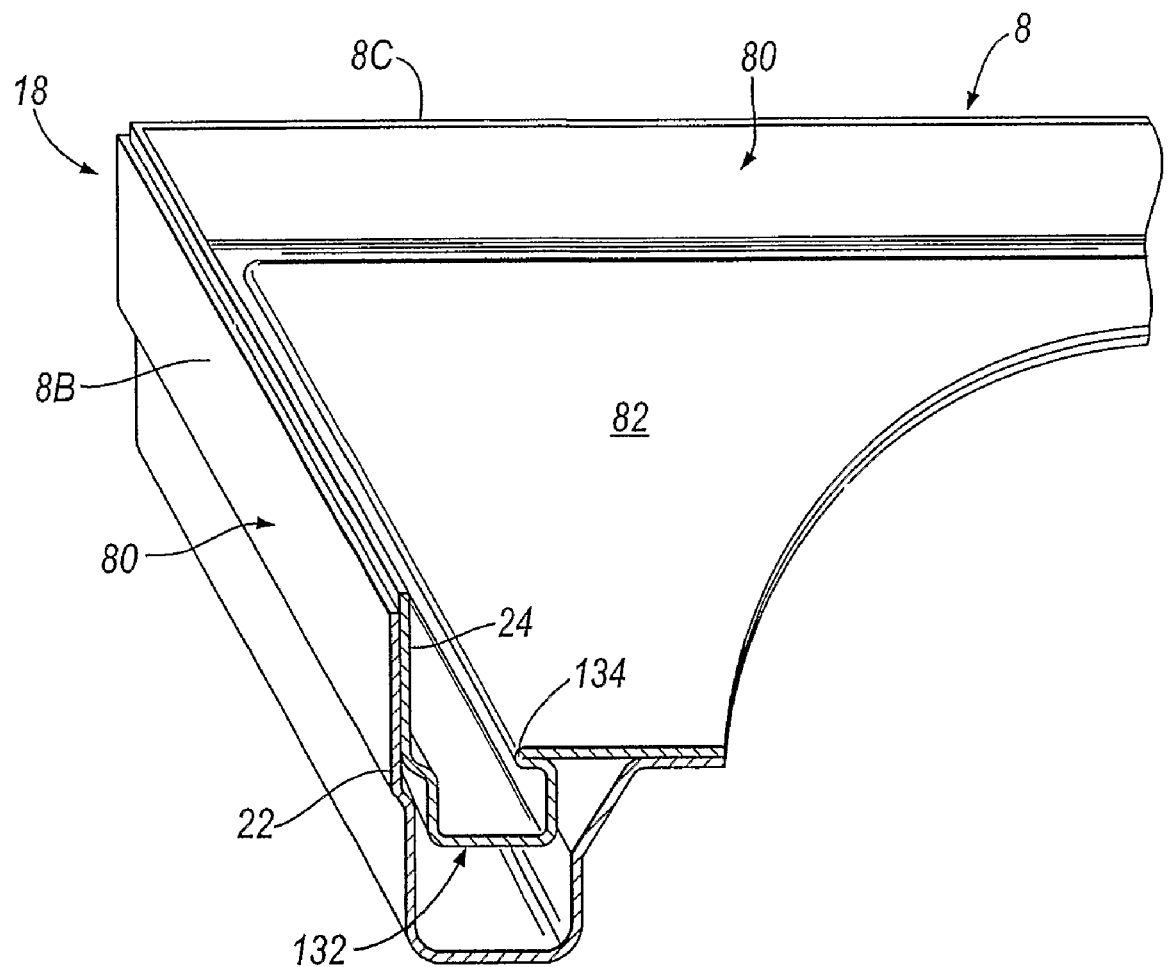
FIG. 2 is a diagrammatic perspective view of the part of the window frame shown circled at II in FIG. 1 but omitting the window sealing and guiding strip assembly.

The frame 8 carried by the door 5 is (in this example) made of metal, such as extruded aluminium, or of hard plastics. FIG. 2 shows part of the frame 8 at the corner 18 and is an enlarged view of the region II of FIG. 1. The sealing and guiding strip assembly is omitted from FIG. 2. The frame 8 is formed from two panels 22,24 of material which are shaped as shown and spot-welded together (or attached by any other suitable means).

At the region shown in FIG. 2, the door frame 8 has a platform 82 (formed by panel 24). Extending generally perpendicularly with respect to the platform is flange 80 (formed by the panels 22,24).

Figure 3:
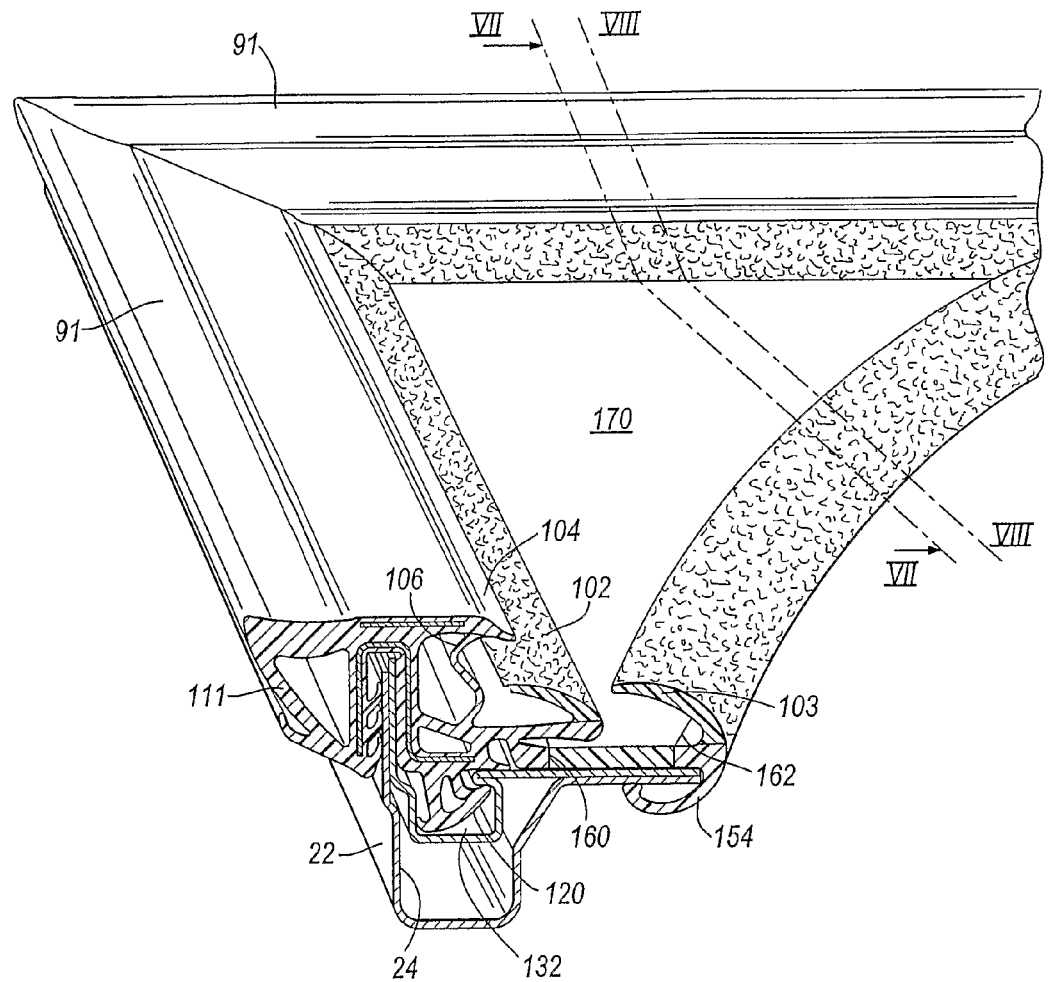
FIG. 3 is a perspective view of the window frame of FIG. 2 and the sealing and guiding strip assembly.
Figure 4:
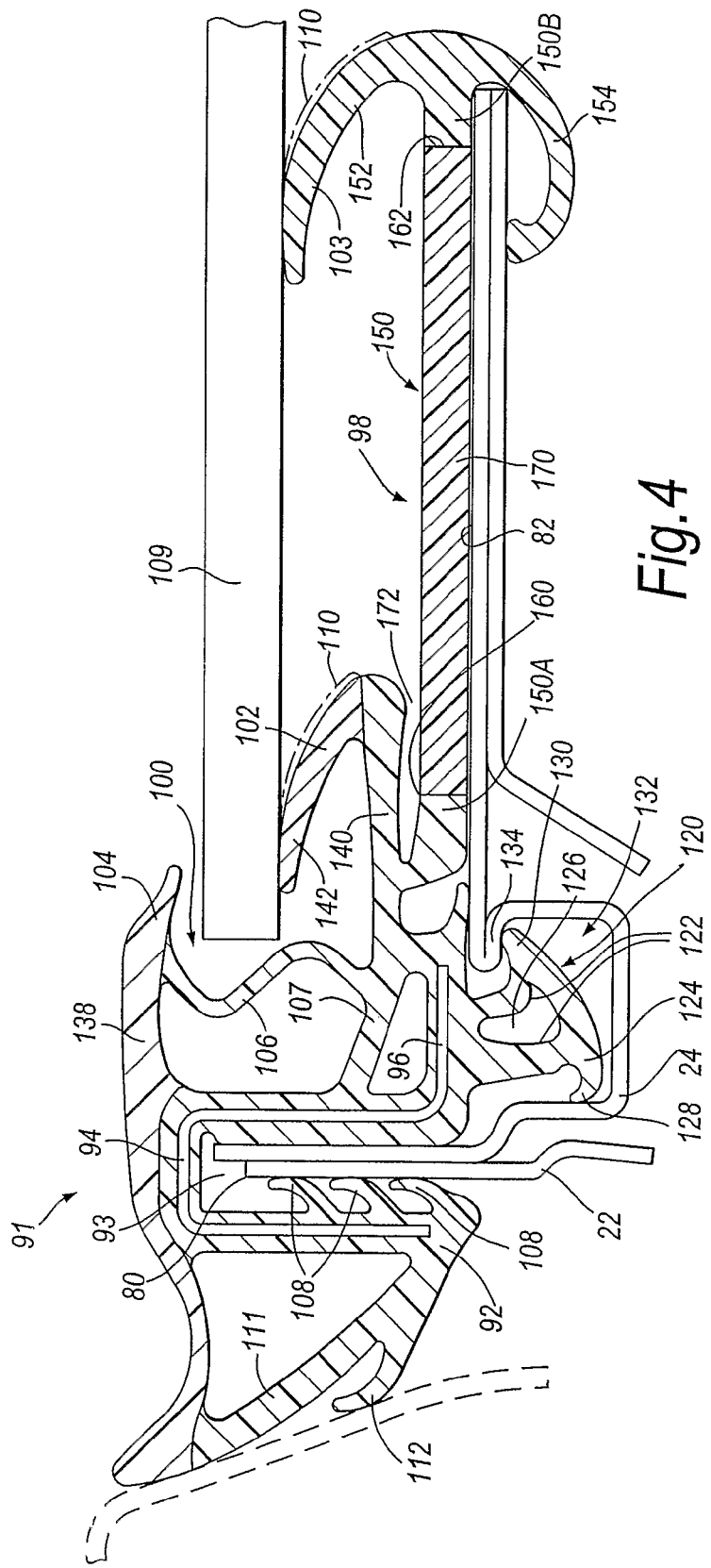
FIG. 4 is a cross-sectional view of the frame on the line VII-VII of FIG. 3 showing an arrangement according to a first embodiment of the invention.

FIG. 3 shows a perspective view of the sealing strip 91 and flange 80 in the region of circle II in FIG. 1, and FIG. 4 shows a cross-section taken along line VII-VII of FIG. 2.

The strip 91 comprises extruded material 92, such as plastics, EPDM, TPE or rubber material, which defines a channel 93 and incorporates a channel-shaped metal carrier 94 embedded within the material of the strip 91. The carrier 94 may take any suitable form. It may be in the form of a continuous unapertured metal channel. Instead, it may be apertured to increase its flexibility. In another form, it comprises a series of side-by-side generally U-shaped metal elements defining the channel and either entirely disconnected from each other or connected such as by short integral flexible connecting links. In a further form, the carrier comprises looped wire. Other possible forms of carrier may be used, though. As shown, the carrier 94 has an integral extension 96 which extends at right angles to the channel 93.

The strip 91 includes a wall 98 of a window glass receiving channel 100. The wall 98 includes two lips 102,103, and the opposite wall of the glass-receiving channel 100 is formed by a lip 104. A first web 106 is formed at the base of the channel 100. As the window glass 109 closes, the glass 109 presses against the web 106 to improve the seal with the glass. The first web 106 is integrally extruded with a second web 107 which extends approximately parallel to the extruded material in which carrier extension 96 is embedded.

At the opposite side of the carrier extension 96 a generally hook-shaped part 120 is integrally extruded. The hook-shaped part 120 includes walls 122 which meet at a base 124, and between them define a space 126. The base 124 includes projections 128,130 at opposite ends thereof for engaging a channel 132 formed by the panel 24, and in particular engaging the flange 134 formed by the panel 24 at the entrance to the channel 132. The walls 122 and base 124 are resiliently deformed as the hook-shaped part 120 is pushed into the channel 132, whereafter they resile and locate the strip 91 with respect to the channel 132. The carrier extension 96 increases the rigidity of the strip 91 in the region of the hook-shaped part 120 to improve this positioning.

The inner lip 102 includes a base part 140 and a sealing part 142, the latter pressing against window glass 109 in use. The sealing part 142 is shown with a different hatching pattern, indicating that it is made of softer material than the base 140 (and other parts of the strip 91 hatched similarly to the base 140).

The upper part 138 of the sealing strip (as shown in the Figures) may also be formed of a relatively soft material, as indicated by the different hatching.

The base 140 of the lip 142 integrally extends from the region where the hook-shaped part 120, first web 106 and second web 107 meet. The base 140 is generally planar. From approximately mid-way along the base 140 of the lip 102 the generally planar base 150 of the lip 103 extends. The base 150 extends generally parallel to the base 140. The lip 103 includes a sealing part 152, similar to the sealing part 142 of the lip 102. As with lip 102, the different hatching pattern of the sealing part 152 indicates that this part is formed of softer material.

Extending from the opposite side of the base 150 to the sealing part 152 is a cosmetic lip 154 which extends over the panels 22,24 so that the edges of these panels (which can be seen in FIG. 2) are hidden. As can be seen in FIGS. 3 and 4, the base 150 covers the platform 82 (shown in FIG. 2) so that this too cannot be seen.

In use, two lengths of the sealing strip 91 are mounted in position on the flange 80 leading towards and up to the corner 18 by positioning the strip so that the flange 80 engages in the channel 93 and the hook-shaped part 120 engages the channel 132. The strip 91 firmly grips the flange 80, the gripping force being assisted by the resilience of the metal carrier 94 and also by the provision of integral flexible lips 108 which extend inwardly of the channel 93. The lips 108 may be extruded so as to be of softer material than the remainder of the extruded material 92, to increase their frictional grip. The two strips 91 are mitre-cut and joined at a line extending to corner 18. In this way, the strips 91 present their glass-receiving channels 100 in the plane of the window opening 10 so that the sliding window glass 109 enters the channel 100. The outwardly facing surfaces of the lips 102 and 104 are coated with flock 110 where they meet the window glass 109. The flock can be formed as part of the extrusion process which forms the strips 91.

As shown in FIG. 4, the sealing strip 91 includes a hollow sealing member 111 on the outside of the window frame, that is, on the outside edge of the door. This sealing member 111 engages the frame of the door opening when the door 5 is closed, to provide a seal around the edge of the door. A lip 112 extends from the sealing member 111 and also engages the frame of the door opening when the door 5 is closed.

In this embodiment the strip 91 extending along the roofline and the strip 91 extending along the B pillar 12 have generally the same configuration—but this is not essential.

As explained above, the platform 82 is present at the corner 18 but is not present at other areas of the frame 8 (for example as it extends generally parallel to the vehicle roof 14 and generally parallel to the A and B pillars 11,12—other than at the corner 18). It is generally desired to have a single extruded glass run extending continuously along the B-pillar and another extruded glass run extending continuously along the roof line and the A-pillar. This provides an attractive appearance, without the joins (other than at the corner 18).

In order to accommodate the platform 82 at the corner 18, the extruded material of the base 150 of the lip 103 is cut at cut lines 160,162, splitting the base 150 into an inner base part 150A and an outer base part 150B. The extruded material between the cut lines 160,162 is discarded. A planar sheet of rubber material 170 is then inserted and moulded onto the parts 150A and 150B at the points of the cut lines 160,162 to form a flap of flexible material extending over the platform 82. The flap is generally triangular in shape but curved along the hypotenuse.

Advantageously, the join between the inner base part 150A and the moulded part 170 is obscured from view by the base 140 of the lip 102. Additionally, the join between the moulded part 170 and the outer base part 150B is obscured by the sealing part 152 of the lip 103.

The moulded part 170 may be formed of TPE or EPDM or any other suitable material. The end of the base part 140 from which the sealing part 142 integrally extends may be joined to the moulded part 170 at the region 172 during the moulding operation which forms the part 170 in order to better locate the sealing part 142 of the lip 102. The connection between the base part 140 and the moulded part 170 at the region 172 may alternatively be achieved by applying an adhesive. It should be understood that the connection between the base part 140 and the moulded part 170 at region 172 is not necessary or essential to the invention.

Figure 5:
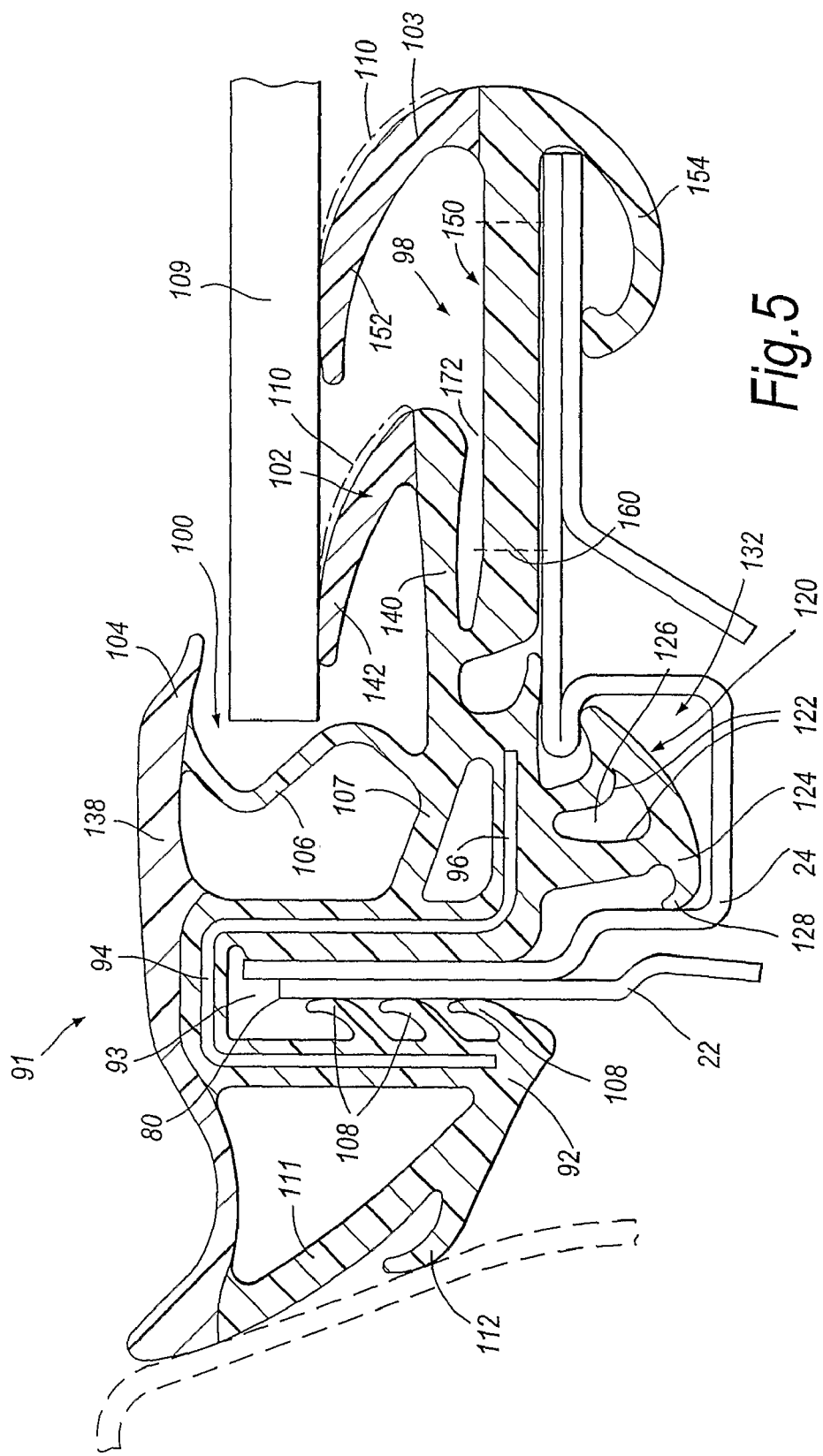
FIG. 5 is a cross-sectional view of the frame and sealing and guiding strip on the line A-A of FIG. 1 according to a first embodiment of the invention.
Figure 6:
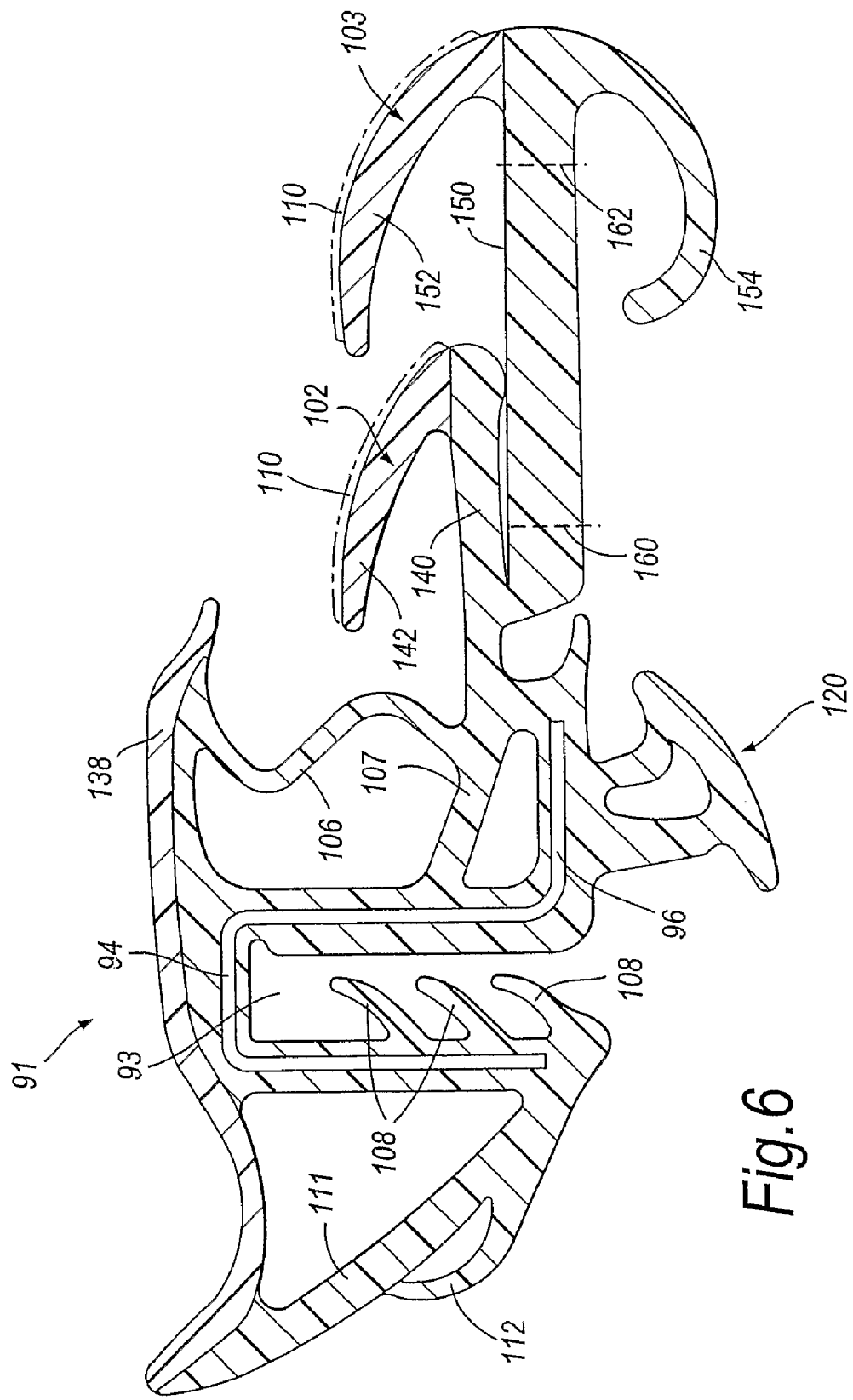
FIG. 6 is a cross-sectional view corresponding generally to FIG. 5 but with the frame omitted.

FIGS. 5 and 6 show a cross-section taken along the line A-A of FIG. 1, at a region along the roof line of the frame 8 but spaced from the corner 18 and the platform 82. FIG. 6 shows the strip 91 of FIG. 5 but omits the window glass 109 and the panels 22,24. The strip 91 and the frame 8 in cross-section taken along the B-pillar 12 away from the corner 18 and the platform 82 may have a similar configuration. For ease of understanding the cut lines 160 and 162 are shown in FIGS. 5 and 6. However, in these Figures the extruded material of the base 150 of the lip 103 is not cut and remains in the form as originally extruded. The moulded part 170 is not required in the regions of the strip 91 away from the corner 18 and the platform 82. In a similar manner to FIG. 4, the base 140 of the lip 102 may be joined to the base 150 of lip 103 at a region 172. In FIGS. 5 and 6 this joining may be performed immediately after the extrusion process, that integrally forms the complete strip 91 as shown, by pressing the base 140 and the base 150 together by rollers at the region 172. Alternatively, this joining could be achieved by applying an adhesive. The joining at the region 172 is not essential to the invention.

Figure 7:
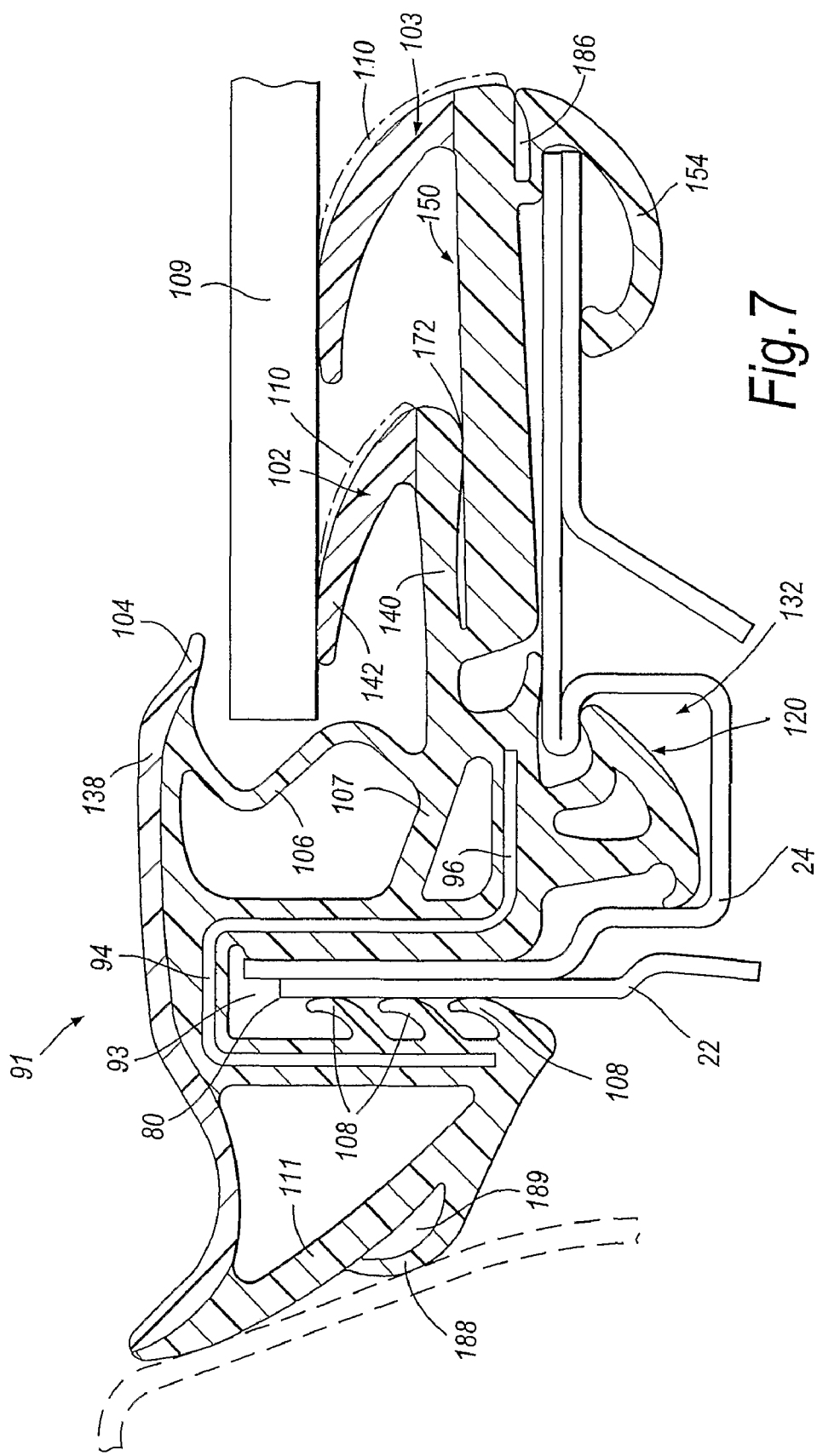
FIGS. 7 and 8 correspond generally to FIGS. 5 and 6 but show the sealing and guiding strip modified in accordance with a second embodiment of the invention.
Figure 8:
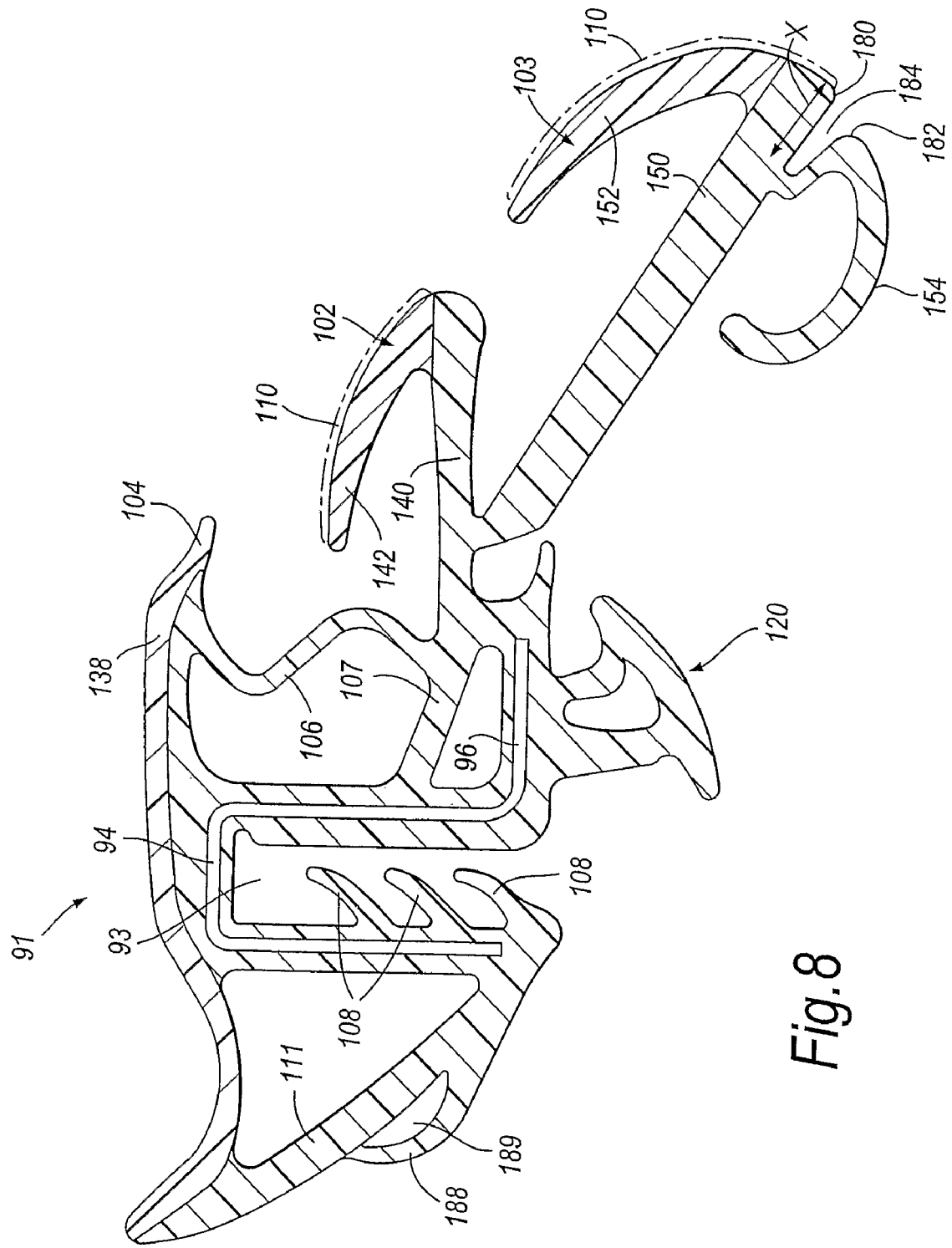

The strips shown in FIGS. 7 and 8 correspond generally to those shown in FIGS. 5 and 6 but the configuration at the region where the cosmetic lip 154 extends from the base 150 is different. As shown in FIG. 8 the point at which the cosmetic lip 154 connects to the base 150 is positioned inwardly of the distal edge 180 of the base 150 (from where the sealing part 152 extends) by a distance X. The distal edge 180 of the base 150 may be joined to a connection surface 182 of the cosmetic lip 154 immediately after extrusion by pressing the edge 180 and surface 182 together with a roller, thereby forming a cavity or chamber 186 from the recess 184. Alternatively, the parts 180 and 182 could be coupled together by adhesive. However, the parts 180 and 182 need not be joined together in this way. When the extruded material of the strip 91 is mounted on the frame 8 (as shown in FIG. 7) the planar configuration of the panels 22,24 extending generally parallel to the base 150 will, in conjunction with a force applied by the resilience of the cosmetic lip 154, tend to press the parts 180 and 182 together, thereby forming the cavity or chamber 186 from the recess 184.

In this embodiment, the flock 110 applied to the lip 103 is formed along the sealing part 152 and down to the corner formed at the distal edge 180 of the base 150 and possibly partway into the recess 184. The flock 110 is formed during the extrusion process. When the strip is mounted to the frame 8 (and/or when the chamber 186 is formed by joining the parts 180 and 182), a sharp and visually pleasing line of separation (or edge) between the flocked layer 110 and the cosmetic lip 154 is formed). As will be known to those skilled in the art, it is very difficult to produce a sharp linear edge to a flocked area. By providing the recess 184/cavity 186 of this embodiment, this disadvantage is overcome. The flocked sealing part 152 is abutted against a non-flocked surface 182 of the cosmetic lip 154 to provide the desired linear edge to the flock 110.

In the second embodiment shown in FIGS. 7 and 8 the lip 112 extending from the sealing member 111 of the first embodiment is replaced with an abutment wall 188 extending from the sealing member 111. The abutment wall 118 and the sealing member 111 define a hollow chamber 189. The sealing member and the abutment wall 188 engage the frame of the door opening when the door 5 is closed, to provide a seal around the edge of the door. The use of a lip 112 or abutment wall 188 may be selected for use in any of the embodiments disclosed herein in accordance with the circumstances.

It will be noted that in FIG. 8 the base 150 is shown as extending away from the base 140. The sealing strip 91 may have this configuration after it exits the extrusion die used for forming the seal 91. The base 150 will be pushed into generally parallel alignment with the base 140 when the sealing strip 91 is mounted to the panels 22,24. However, it may be advantageous to arrange the extrusion process and the extrusion die such that the base 150 extends generally parallel to the base 140 even when the strip 91 is not mounted to the panels 22,24. In such an arrangement, the base 150 would not extend away from the base 140 in the manner shown in FIG. 8 as the strip 91 exits the extrusion die.

Figure 9:
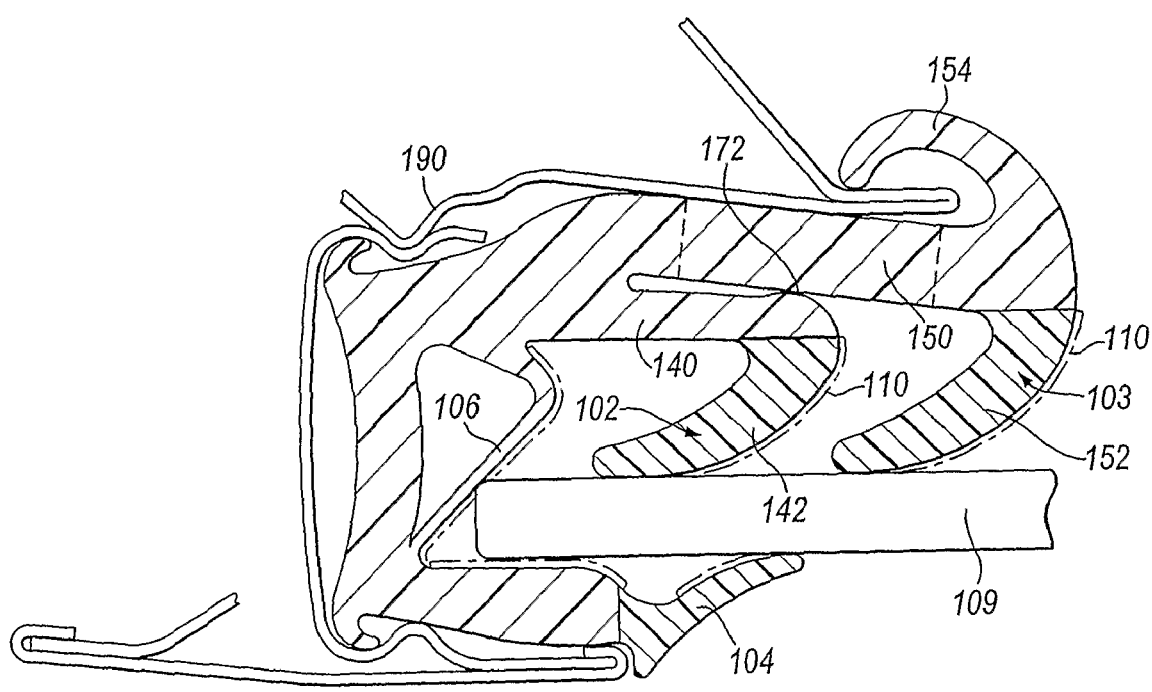
FIG. 9 is a cross-sectional view of the frame and sealing and guiding strip on the line B-B of FIG. 1 in accordance with a third embodiment of the invention.

As indicated above, FIG. 5 shows a cross-section taken along the line A-A of FIG. 1—along the roof line of the frame 8. As mentioned in relation to FIG. 5, the configuration along the B-pillar 12 may be similar. However, the frame 8 may have a different configuration along the B-pillar 12, for example as shown in FIG. 9. In FIG. 9 the frame 8 forms a generally U-shaped channel 190 (formed by various shaped and connected panels formed of suitable material such as metal or rigid plastics). The strip 91 extending along the B-pillar 12 does not include the channel 93 but instead is clamped by the U-shaped channel 190. An upper (in the Figure) leg of the U-shaped channel 190 extends generally parallel to the base 150 of the second lip 103, and the distal end thereof is covered by a cosmetic lip 154. The lower (in the Figure) leg of the U-shaped channel 190 extends generally parallel to the lip 104 of the strip 91, pressing this lip against the window glass 109. No carrier 94 is provided, and only a single web 106 is formed. The hook-shaped part 120 is also omitted as it is not required and no corresponding channel 132 is provided in the U-shaped channel 190. Other parts of the strip 91 though correspond generally to those similarly referenced and similarly appearing parts described above. In FIG. 9 the cut lines 160 and 162 are shown, where the extruded material of the base 150 is removed in the region II (FIG. 1). Moulded material as shown in FIG. 4 is moulded onto the extruded material of the base part in region II, as described above, thereby forming the planar moulded part 170 extending between the strip 91 running parallel to the roof line and the strip 91 running parallel to the B-pillar 12.

The arrangement shown in FIG. 9 may be modified to include the recess 184/cavity 186 described in relation to FIGS. 7 and 8 in order to provide the desirable visually pleasing linear edge to the flocked surface 110 of the lip 103.

Figure 10:
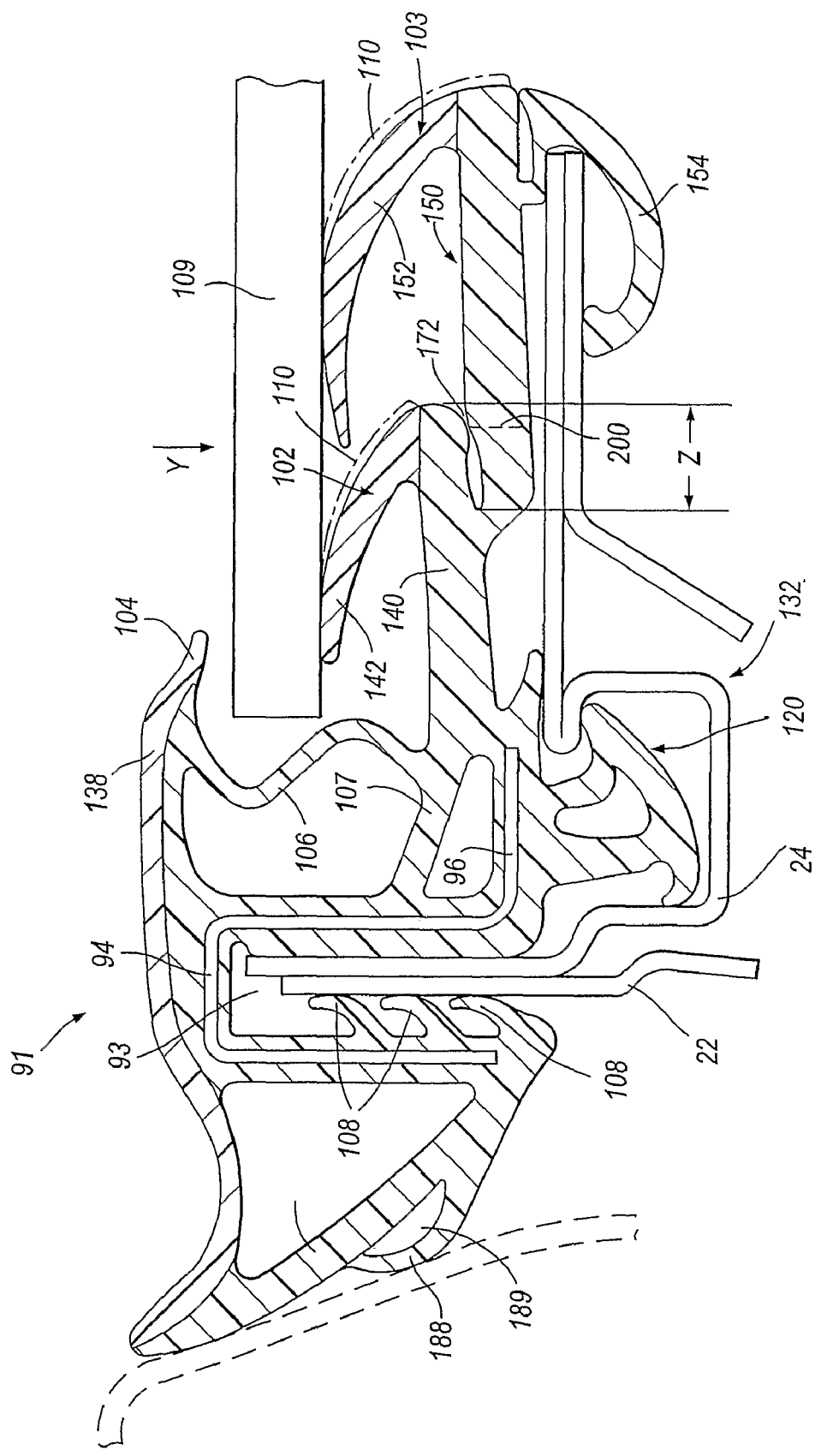
FIG. 10 shows a cross-section taken on the line A-A of FIG. 1 but modified in accordance with a fourth embodiment of the invention.

In the embodiments described above two cut lines are formed in the extruded material of the base 150 in order that the moulded part 107 can be inserted. FIG. 10 shows a modification in which only a single cut line 200 is formed. The extruded material is separated at the cut line 200 and a moulded part 170 corresponding generally to the moulded part 170 described above in relation to FIG. 4 is inserted in the region II of FIG. 1. The inner join between the moulded part 170 and the extruded base 150 will be obscured by the base 140 of the first lip 102. The outer join between the moulded part 170 and the extruded base 150 is obscured by extending the sealing part 152 of the second lip 103 to a point Y, such that it overlies the join at the cut line 200.

The distance Z between the point where the base 150 joins the base 140 and the distal end of the base 140 is preferably ≦3 mm in the FIG. 10 embodiment and all the other embodiments.

Figure 11:
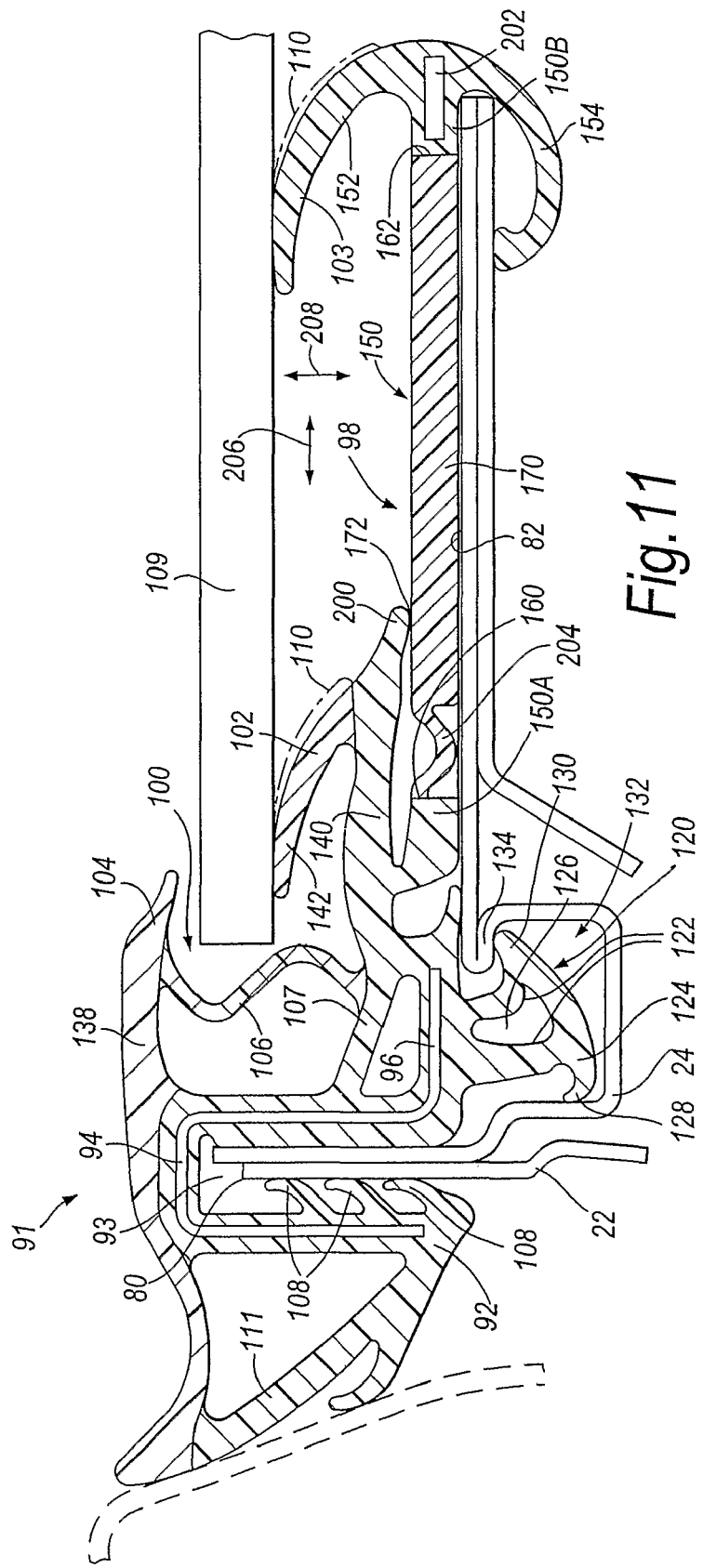
FIG. 11 shows a cross-section taken along the line VII-VII of FIG. 3 but modified in accordance with a fifth embodiment of the invention.

FIG. 11 shows a cross-section taken along the line VII-VII of FIG. 3 but modified in accordance with a fifth embodiment of the invention. The FIG. 11 embodiment is similar to the embodiment shown in FIGS. 1 to 6 (FIG. 11 corresponding to the view shown in FIG. 4). However, the FIG. 11 embodiment includes the modifications discussed below.

Firstly, the web 106 is made of material which is relatively soft compared to the base 140 and other parts of the sealing strip 91 that are hatched similarly to the base 140. For example, the first web 106 may have the same or substantially the same hardness as the upper part 138 of the sealing strip 91 and the lips 102,103. As before, the first web is integrally extruded with other parts of the strip 91.

In a second modification, the base 140 of the lip 102 terminates in a lip 200 which meets the moulded part 170 at the tip region 172 thereof. As in the previous embodiments, the region 172 may be joined to the moulded part 170 during the moulding operation which forms the part 170, in order to better locate the sealing part 142 of the lip 102. The connection between the region 172 and the moulded part 170 may alternatively be achieved by applying an adhesive, although it should be understood that the connection between the base part 140 at region 172 and the moulded part 170 is not necessary or essential to the invention.

In a third modification the upper surface of the base part 140 of the lip 102 (which faces the sealing part 142 of the lip 102) has a domed surface.

In a fourth modification an additional relatively rigid carrier 202 is incorporated in the outer base part 150B of the base 150 of the strip 91. The carrier 202 may preferably comprise metal, but could also be formed of another rigid material, such as hard rubber. The additional carrier 202 is a planar elongate member which extends into and out of the page of FIG. 11 as shown. The carrier 202 is positioned in the region where the sealing part 152 of the lip 103 meets the outer base part 150B. The carrier 202 increases the longitudinal rigidity of the distal end of the base part 154.

The carrier 202 is integrally embedded within the base part 150 during the extrusion process that forms the base 150 (and other extruded components of the strip 91). The strip 91 will emerge from the extruder as it is formed. The presence of the additional carrier 202, by increasing the longitudinal rigidity, will eliminate or reduce the tendency for the strip 91, and in particular the distal end of the base 150, to sag or bend downwards as it emerges from the extruder. This makes it easier to handle the strip 91. For example, it is easier for the strip 91 to be accurately cut to the required size. The additional carrier 202 also makes it easier to locate and position the strip 91 in the mould during which the flap 170 is moulded thereto.

In a fifth modification, a reduced thickness portion 204 of the moulded flap 170 is provided at the region where it connects to the inner base part 150A at cut line 160. The reduced thickness portion 204 is more readily longitudinally compressible and stretchable in the direction of arrow 206 than the remainder of the moulded flap part 170. In this embodiment the length (in the direction of arrow 206) will be larger than required (for example 10% larger than required) to allow the strip 91 with the moulded flap part 170 attached to fit over the distal end of the panels 22,24 (with the cosmetic lip 154 embracing the distal end of those panels). When the strip 91 is fitted to the panels 22,24 the reduced thickness portion 204 will have a curved or concertina-like configuration shown in FIG. 11 due to the excess length of the moulded flap part 170.

The provision of the reduced thickness portion 204 allows the strip 91 to be fitted relatively simply to platforms 82 (formed of panels 22,24) of slightly varying dimenions—for example, due to manufacturing tolerances.

The reduced thickness portion 204 may also simplify the mounting of the strip 91 to the platform. The reduced thickness portion can be extended (so that it extends linearly and possibly is further elastically stretched) in order to assist in locating the cosmetic lip 154 around the distal end of the platform 82. The distal end of this strip (at the outer base part 150B) may then be pushed inwards towards the flange 80, reversing any elastic stretching of the reduced thickness part 204 and causing that part to adopt its curved, concertina-like configuration shown in FIG. 11. The cosmetic lip 154 will then embrace the distal edge of the platform. The resilience of the cosmetic lip 154 may clamp the strip in position on the platform to prevent further compression or stretching of the reduced-thickness portion 204.

When the reduced-thickness portion 204 is provided, it may be advantageous not to join the lip 200 to the moulded flap part 170 at region 172 (as this would restrict the amount of compression or extension of the flap 170). However, even if the lip 200 is connected to the flap 170 at the region 172, movement of the flap 170 could be accommodated by compression or extension of the lip 200 (which could itself have a reduced thickness portion like the reduced thickness portion 204).

The reduced thickness portion 204 also allows the strip 91 to accommodate variations in the orientation of the platform 82. For example, if the platform 82 is not precisely perpendicular to the flange 80, the reduced thickness portion 204 allows the flap to follow changes in orientation of the platform 82 in the direction of arrow 208.

It should be appreciated that, although the reduced thickness portion 204 is shown at the end of the flap 170 which joins the inner base part 150A at cut line 160, the reduced thickness part 204 could be positioned at the opposite end of the flap, joining the outer base part 150B at cut line 162, or at any position along the length of the flap 170. If the reduced thickness portion 204 is positioned outwardly of the region 172, the lip 200 may advantageously be moulded or adhered to the flap 170.

It should further be appreciated that the compressibility and extendibility/stretchability of the flap 170 may be provided other than by a reduced thickness portion 204. For example, a portion of the flap 170 may have a different composition or be treated in a manner that allows it to be relatively compressible/stretchable compared to the remainder of the flap 170. Further alternatively, the entire flap 170 can be made of a material that is easily stretchable/compressible in order to accommodate manufacturing tolerances in the platform 82.

Although the first to fifth modifications described above are shown in a single embodiment, it should be appreciated that any one of or any combination of these modifications could be made to a sealing strip and provide the advantages associated with the or each selected modification. It is not necessary for all five of the modifications to be provided to a single sealing strip. For example, any one of or any combination of the modifications could be applied to the sealing strip shown in FIGS. 1 to 6, 7 to 8 or 10.

There may be circumstances in which it is desired to secure the moulded flap 170 securely to the platform 82 (comprising the panels 22,24). This will more securely locate the sealing lip 103 (and also the sealing lip 102 if it is attached to the moulded flap 170 at region 172). This may be advantageous in cold weather conditions, when the lip 102 and/or 103 may freeze to the window glass 109. Raising or lowering the window glass 109 in these conditions will cause the lips 102 and/or 103 to move with the window whilst they are adhered thereto. After a degree of movement the resilience of the lips 102/103 will break the bond to the window glass 109 in most circumstances. By attaching the moulded flap part 170 more securely to the platform 82 the amount of movement of the lip 102 and/or 103 in such circumstances is reduced.

Figure 12:
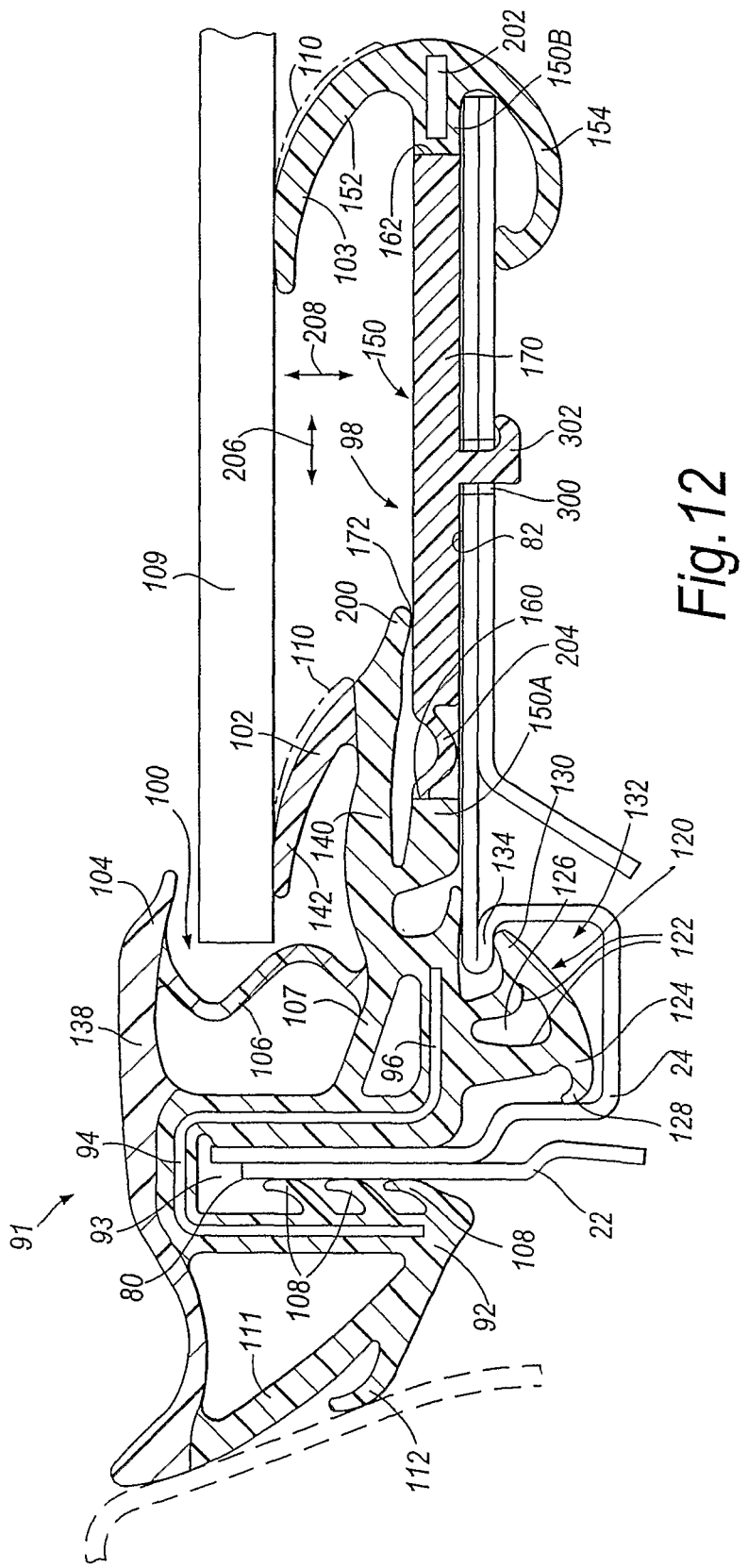
FIG. 12 shows a cross-section taken along the line VII-VII of FIG. 3 but modified in accordance with a sixth embodiment of the invention.

FIG. 12 shows a sixth embodiment of the invention for more securely attaching the moulded flap part 170 to the platform 82. A hole 300 is formed through the panels 22,24 forming the platform 82. Integrally moulded with the flap part 170 is a L-shaped clamping member 302. When the sealing strip to which the moulded flap part 170 has been moulded is mounted to the frame (including the platform 82) the clamping member 302 is aligned with the hole 300 and pushed through the hole 300. The base of the clamping member 302 is resiliently deformed as it passes through the hole 300, whereafter it resiles and serves to clamp the moulded flap portion 170 to the platform 82. The holes 300 formed in the platform 82 may be of generally rectangular configuration. One or more such holes 300 may be formed. Corresponding clamping members 302 will be spaced accordingly along the moulded flap part 170 for engaging these holes 300.

Figure 13:
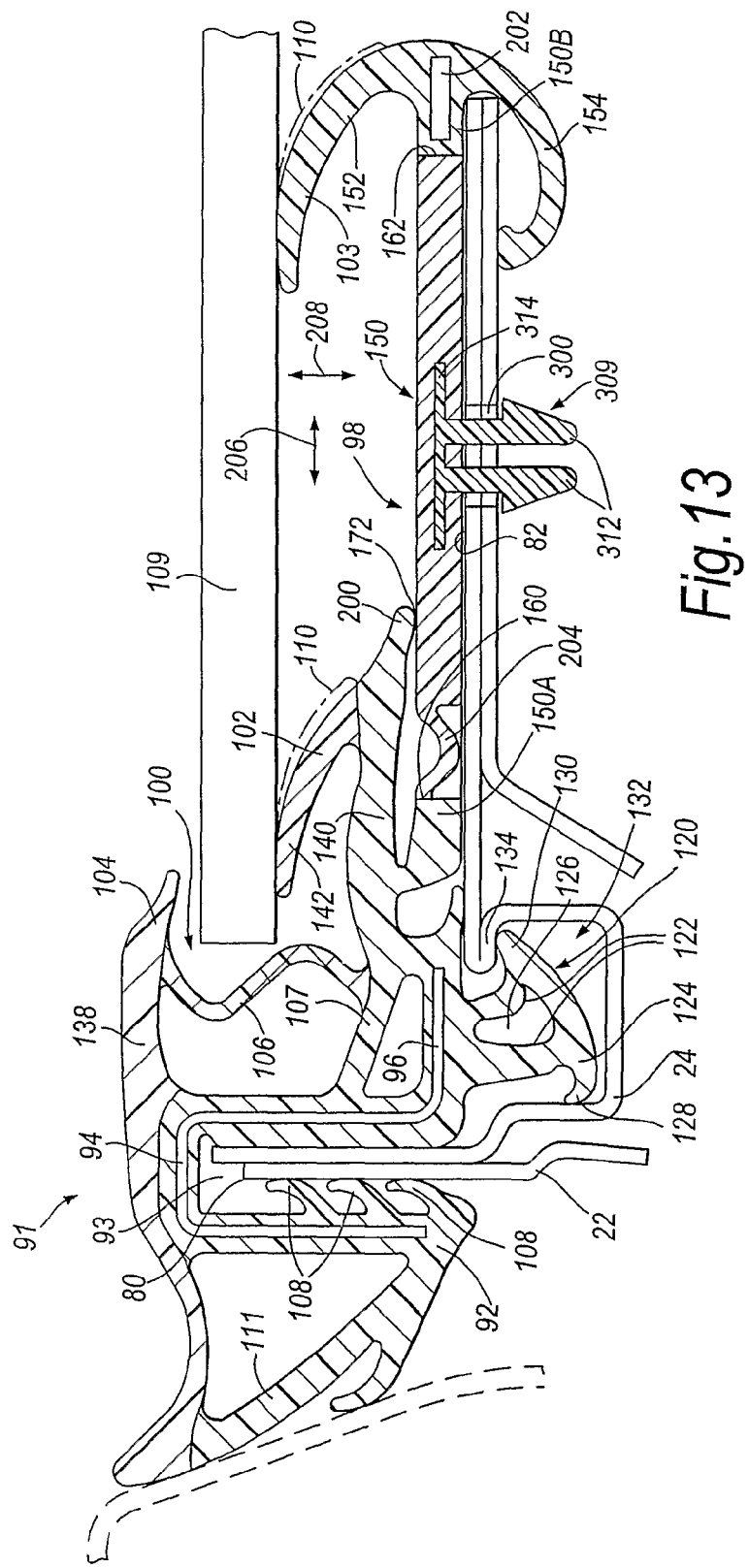
FIG. 13 shows a cross-section taken along the line VII-VII of FIG. 3 but modified in accordance with a seventh embodiment of the invention.

FIG. 13 shows a seventh embodiment of the invention in which the moulded flap portion 170 has a clip 309 formed of relatively rigid material embedded within the part 170 during moulding of the part 170. The clip 309 passes through an aperture 300 formed in the platform 82 to secure the part 170 thereto. The clip 309 comprises resiliently deformable head portions 312 which are resiliently deformable in order to allow the clip 309 to pass through the hole 300, whereafter the head portions 112 resile and clamp the moulded flap part 170 to the platform 82. At the opposite end of the clip to the deformable head portions 312 a generally planar, substantially circular or rectangular base portion 314 is integrally formed.

Figure 14A:
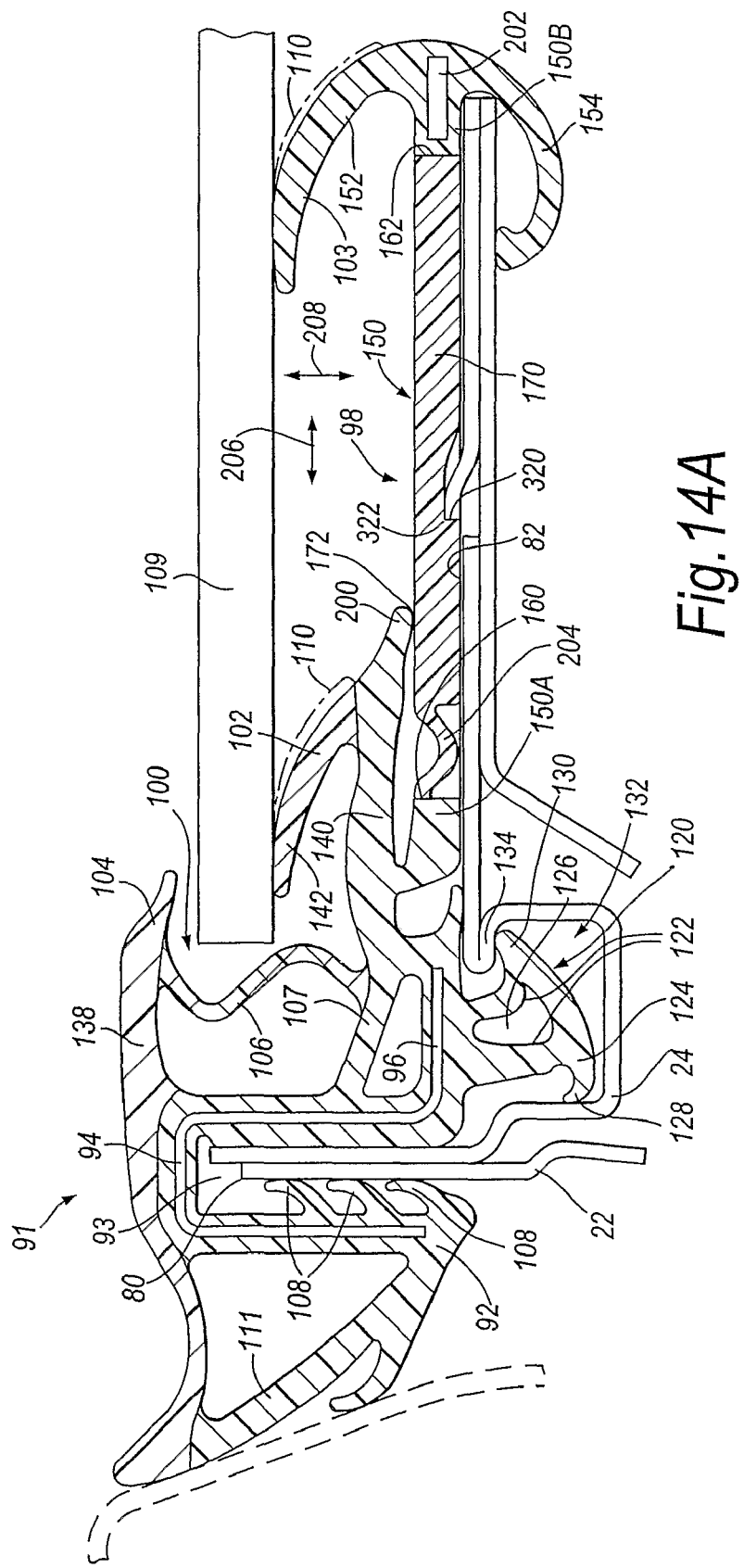
FIG. 14A and FIG. 14B show respectively cross-sections taken along lines VII-VII and VIII-VIII of FIG. 3 but modified in accordance with an eighth embodiment of the invention.
Figure 14B:
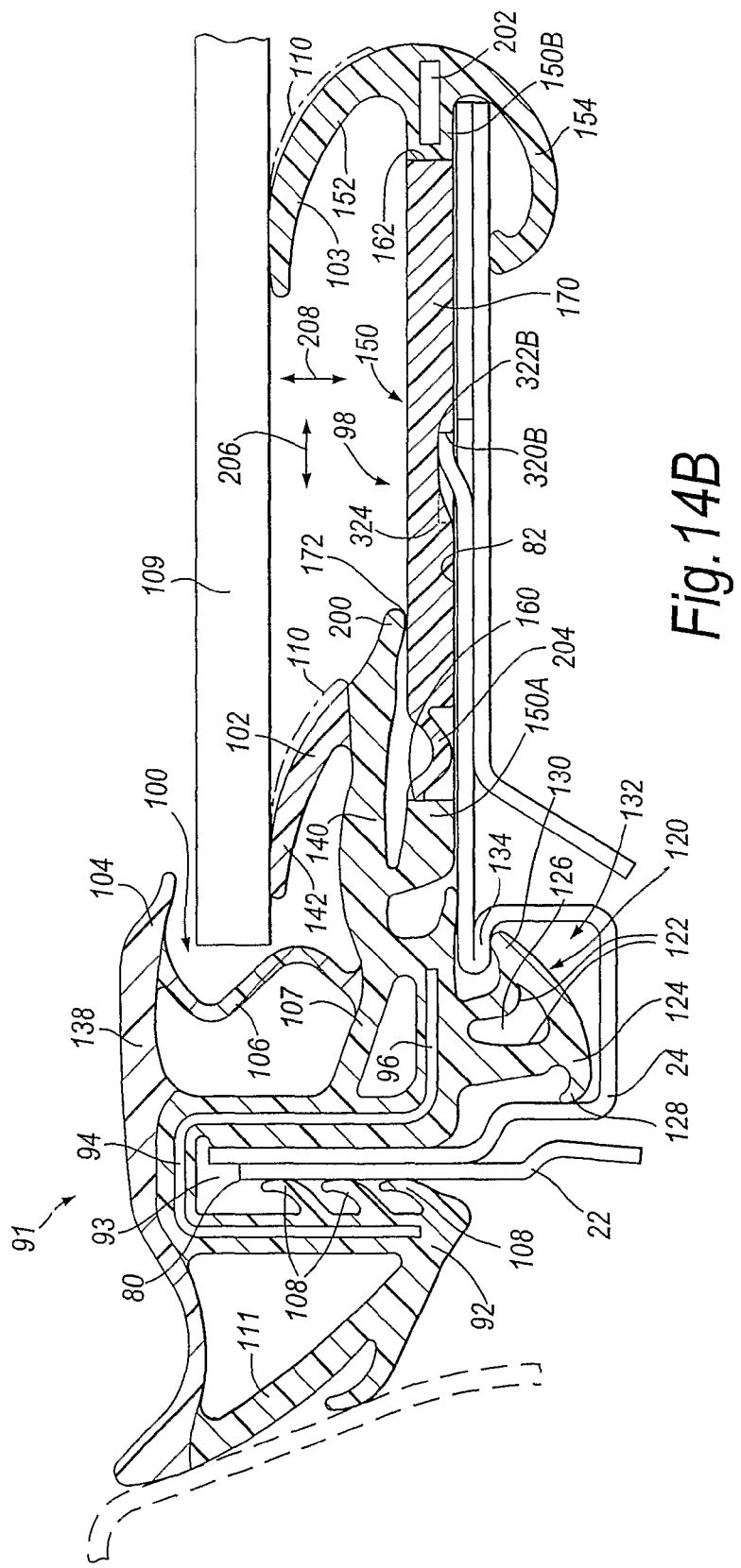

FIGS. 14A and 14B show an eighth embodiment of the invention. FIGS. 14A and 14B are cross-sections respectively along lines VII-VII and VIII of FIG. 3. In FIG. 14A the upper panel 24 forming part of the platform 82 has a cut made therein in the region where the moulded flap part 170 will overlie the platform 82. The part of the panel 24 where this cut is made is bent upwards to space it from the lower panel 22, thereby forming an engagement surface 320 for engaging a recess 322 formed in the moulded flap part 170. The recess 322 has a right-angled corner where it is abutted by the engagement member 320. The recess 322 then has a curved surface which smoothly extends down to the main lower surface of the moulded flap part 170 which overlies the platform 82.

FIG. 14B shows the arrangement at a location on the platform spaced apart from the location shown in FIG. 14A. In FIG. 14B an engagement part 320B is formed from the panel 24 by making a cut in that panel. The engagement part 320B abuts a right-angled corner 322B of a recess formed in the moulded flap part 170. The arrangement of the recess and the engagement part 320B is in the opposite configuration to that shown in FIG. 14A. In combination, the engagement parts 320 and 320B will help secure the location of the lips 102 and/or 103 when the window glass 109 moves both upwardly and downwardly (in the direction of arrow 206). Rather than forming the recess with a different configuration in cross-sections VII-VII (FIG. 14A) and VIII-VIII (14B), a continuous channel comprising a rectangular recess 324 may be formed in the moulded part 170 as shown by the dash lines in FIG. 14B. This recess 324 would at different spaced apart locations abut the engagement parts 320 and 320B at opposite sides thereof.

Although the eighth embodiment shown in FIGS. 14A and 14B show oppositely facing engagement parts 320 and 320B, it should be understood that engagement parts may be provided extending in only one direction. Such engagement parts may either extend continuously along the surface of the platform 82 or only part of the way along the platform 82. For example, a plurality of spaced apart engagement parts could be formed at spaced apart intervals along the platform 82.

Figure 15:
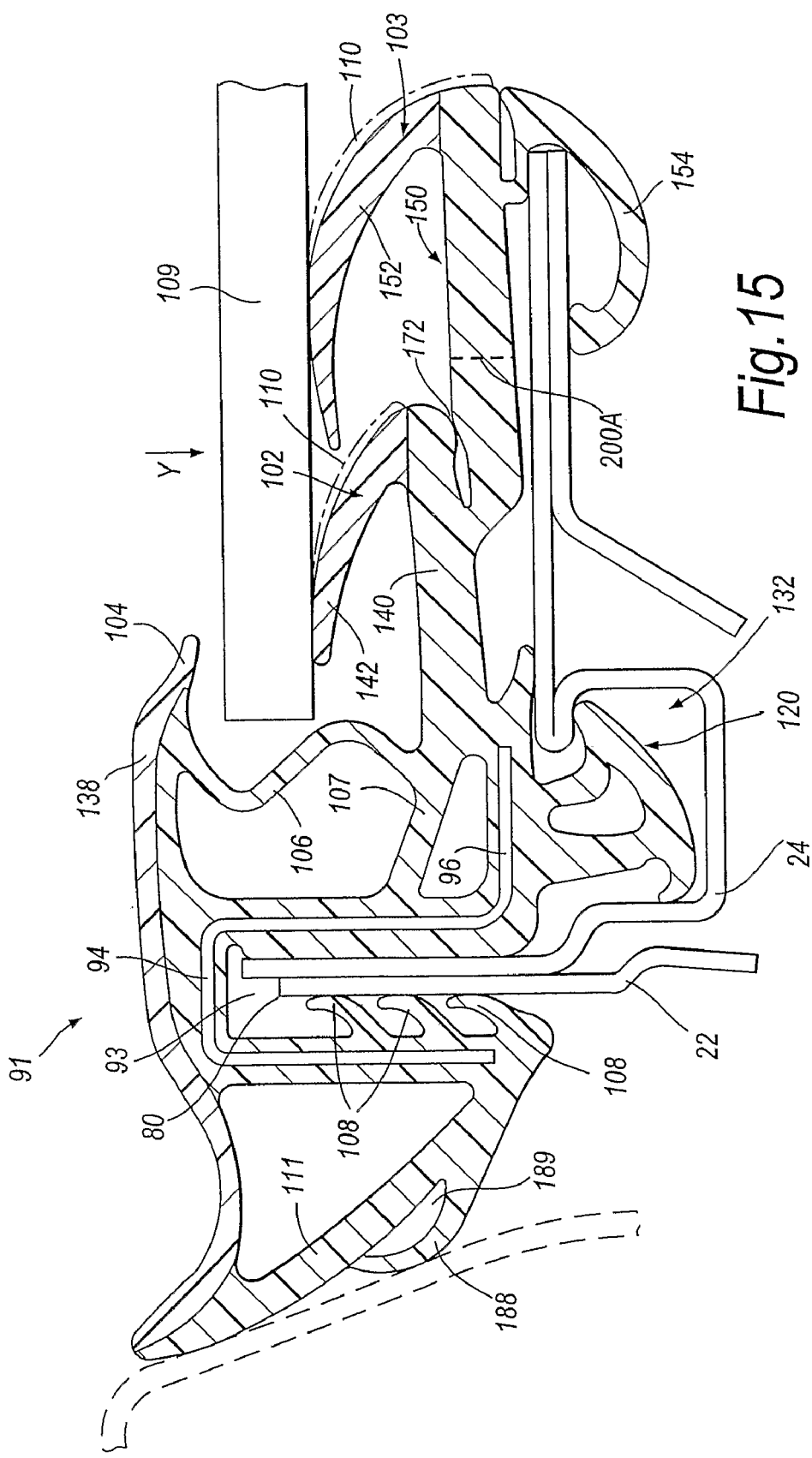
FIG. 15 shows a cross-section taken along the line A-A of FIG. 1 showing an arrangement similar to that of FIG. 10 but with a modified position of the cut line in accordance with a ninth embodiment of the invention.

FIG. 15 shows a further embodiment in which the cut line 200A is not obscured from view by the base 140 of the inner lip 102. The extruded material of the base 150 is separated at the cut line 200A and the moulded flap part 170 is inserted in the region II of FIG. 1. The inner join between the moulded part and the extruded base 150 will not be obscured by the base 140 of the inner lip 102 due to the positioning of the cut line 200A in FIG. 15. The outer join between the moulded part 170 and the extruded base 150 is obscured from view by the extended sealing part 152 of the outer lip 103 to the point Y, such that it overlies the join at the cut line 200A. However, this is not essential. The outer lip 103 may not extend over and obscure the cut line 200A (and thus the outer join between the moulded part 170 and the extruded base 150 in the region II of FIG. 1. Even if one or both of the joins between the moulded flap part 170 and the extruded base 150 is visible, the FIG. 15 embodiment is advantageous because the lips 102 and 103 are formed by extrusion and not by moulding. The flocked surfaces 110 can be formed during extrusion and no post-flocking is necessary. As will be known to those skilled in the art, post-flocking is necessary if a lip or other part is formed by moulding (because the heat from the moulding operation would destroy an already-formed flocked surface).

In the embodiments where there are two cut lines 160 and 162, one or both of these cut lines may not be obscured from view by one or both of the lips 102,104.

Figure 16:
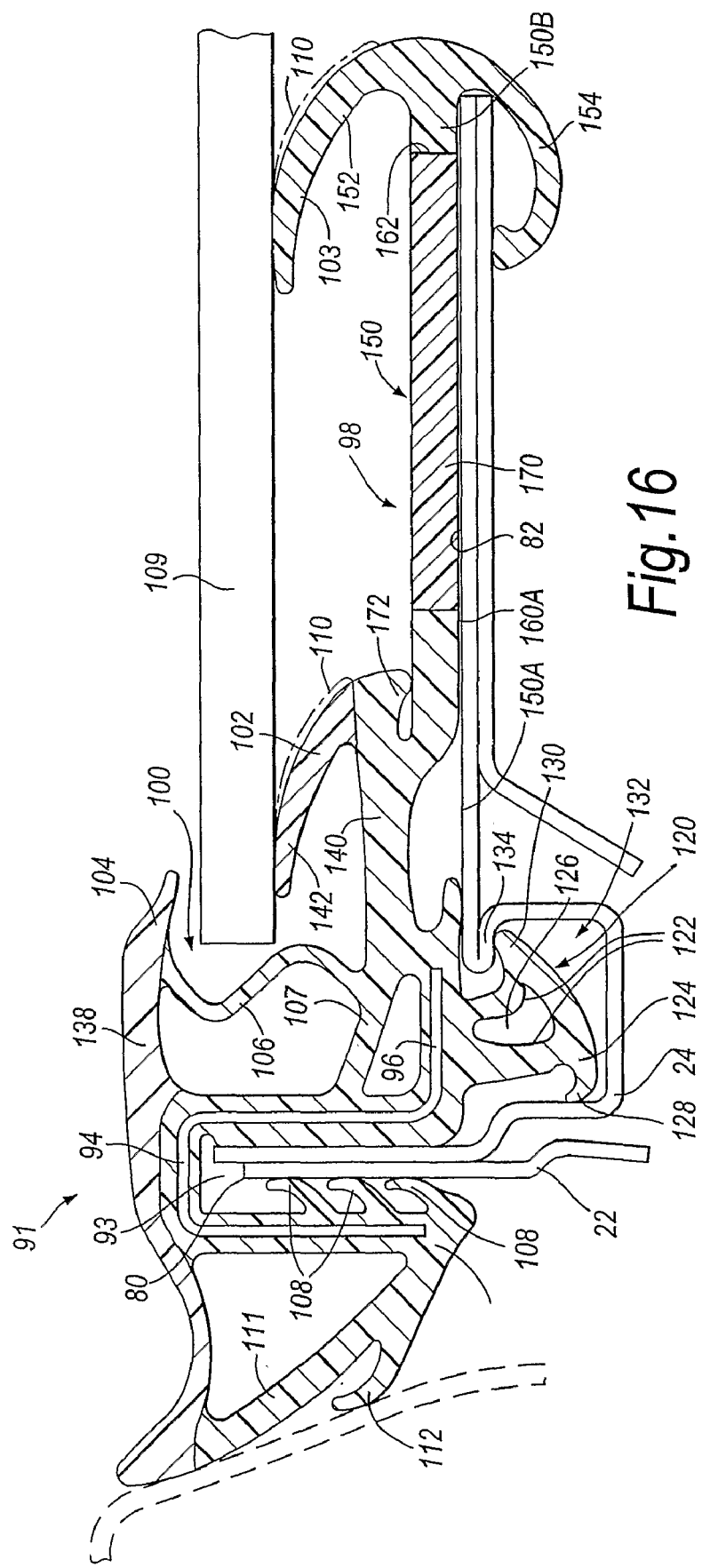
FIG. 16 shows a cross-section taken along the line VII-VII of FIG. 3 showing an arrangement similar to that of FIG. 4 but modified in accordance with a tenth embodiment of the invention by having a first cut line differently positioned.
Figure 17:
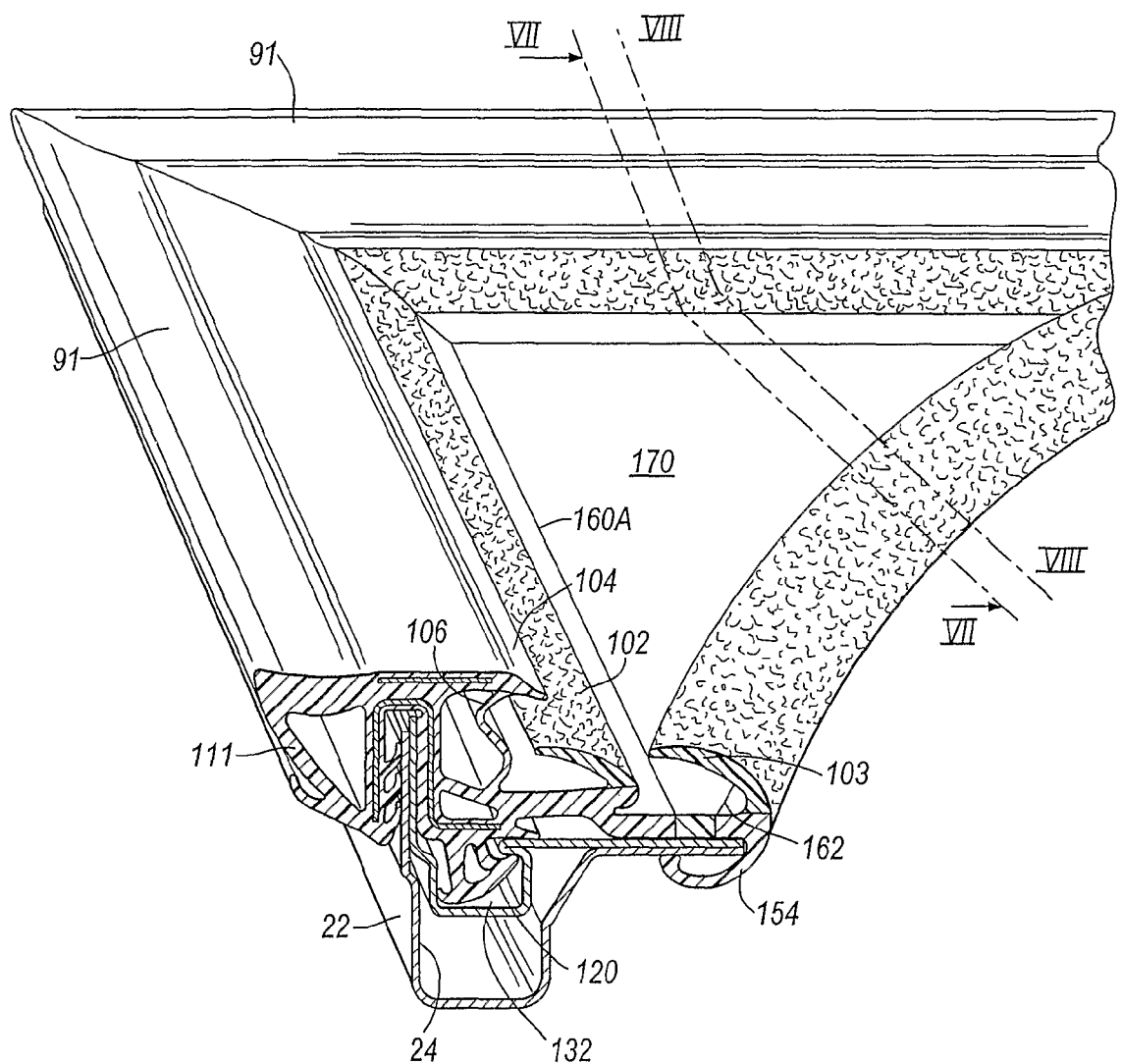
FIG. 17 is a perspective view of the window frame of FIG. 2 having a sealing and guiding strip assembly mounted thereto in accordance with FIG. 16.

FIGS. 16 and 17 show an embodiment in which the first cut line 160A is in a position where it is not obscured from view by the base 140 from which the first lip 102 extends. The cut line 160A is also not obscured from view by the second sealing lip 103. As can be seen from FIG. 17, the cut line 160A may be obscured from view in the position away from the apex of the corner by the second sealing lip 103. However, towards the apex of the corner, where the distance between the outer end of the flap and the apex of the corner is greater, the cut line 160A will be visible.

Figure 18:
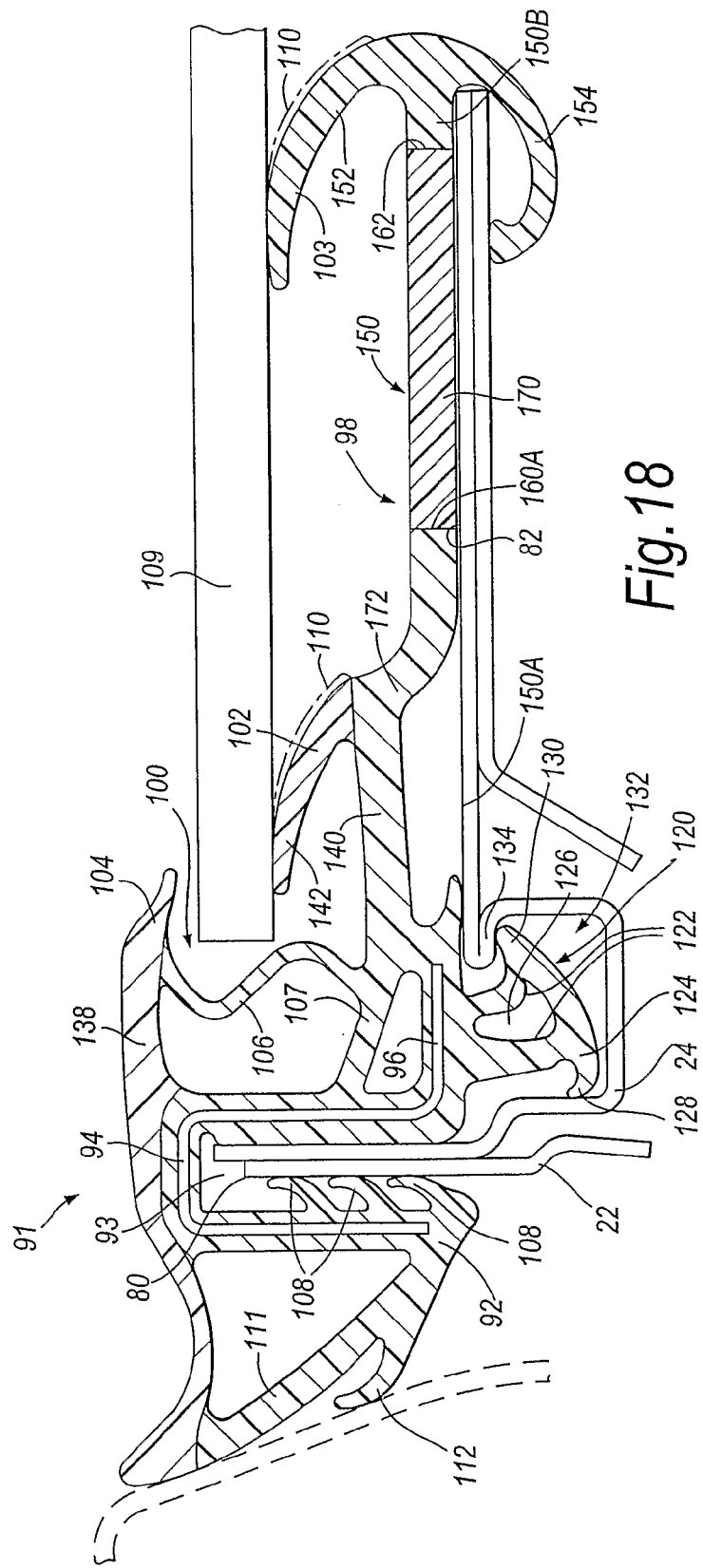
FIG. 18 is a cross-section taken along the line VII-VII of FIG. 3 but modified in accordance with a tenth embodiment of the invention having a generally similar structure to that shown in FIGS. 16 and 17 but with a modified arrangement where the respective bases of the two lips are connected.

FIG. 18 shows a modification to the embodiment shown in FIGS. 16 and 17 in which the form of the connection between the base 140 which supports the first sealing lip 102 and the base 150 which supports the second sealing lip 103 is different. Instead of the base 150 extending from approximately mid-way along the base 140 as in the earlier-described embodiments, in the FIG. 18 embodiment, the base 150 extends from the distal end of the base 140, at the opposite side thereof to the side from which the sealing lip 102 extends. In the FIG. 18 embodiment the cut line 160A is located in a position where it would not be obscured from view by the base 140, and therefore a simpler form of the join between the base 140 and the base 150 may be used.

Figure 19:
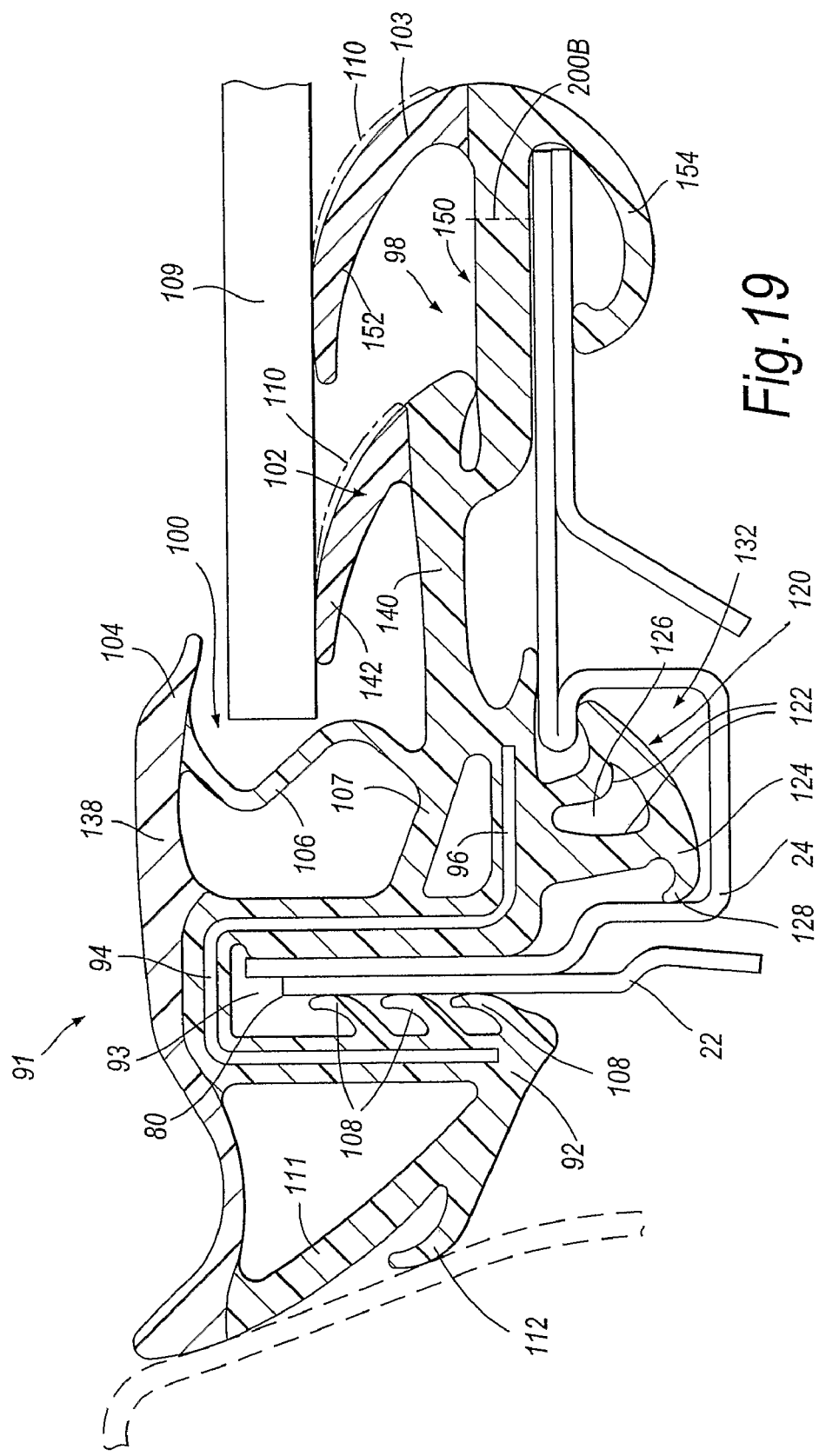
FIG. 19 shows a cross-section taken along the line A-A of FIG. 1 and corresponding to that shown in FIG. 15 but with a alternative position of the cut line between the extruded parts.

FIG. 19 shows a variation of the FIG. 15 embodiment in which the single cut line 200B is located further towards the point where the second lip 103 meets the base 150. At the position of the cross-section at which FIG. 19 is taken, the cut line 200B is obscured by the lip 103. When the moulded flap 170 is inserted between the separated extruded parts, two joins will be present. At positions where the distal edge of the moulded flap 170 is spaced apart from the apex of the corner, one of these joins will be visible.

Figure 20:
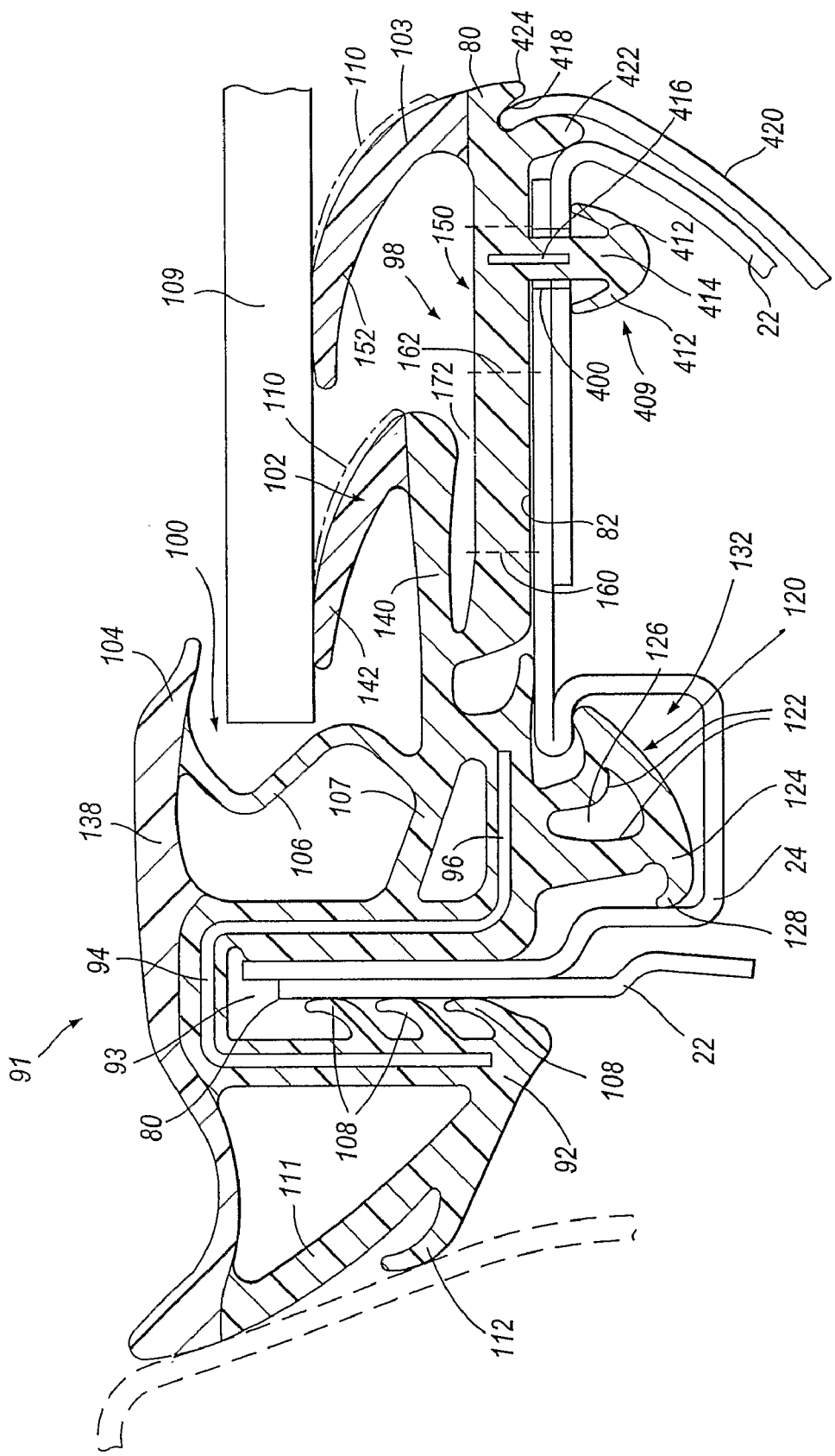
FIG. 20 shows a cross-section taken along the line A-A of FIG. 1 but modified in accordance with a twelfth embodiment of the invention.

FIG. 20 shows a further embodiment of the invention in a view corresponding to that of FIG. 5. In the FIG. 20 embodiment a clip 409 is integrally formed with the base part 150 during the extrusion process that forms the base part 150 (and other extruded components of the strip 91). The clip 409 extends from the underside of the base part 150 (as shown in FIG. 20) and passes through an aperture 400 formed in the panel 24/platform 82. The clip 409 comprises head portions 412 which are resiliently deformable in order to allow the clip 409 to pass through the aperture 400, whereafter the head portions 412 resile and clamp the base part 150 to the panels 22,24/platform 82. The head portions 412 are connected to the base part 150 by an integral linear stem 414. Embedded within the stem 414 may be a relatively rigid length of material or a carrier 416. Such a carrier 416 is, however, optional. The carrier 416 may preferably comprise metal, but could also be formed of other rigid material, such as hard rubber or plastics. The carrier 416 may be planar, elongate member which extends into and out of the page of FIG. 20 as shown. The carrier 416 is positioned so that it extends approximately into two thirds of the depth of the base part 150 and into approximately one half of the depth of the stem 414, the lower end of the carrier 416 extending through the aperture 400.

FIG. 20 shows a further modification in which the panel 22 has a different configuration to that shown in the other embodiments. A first part of the panel 22 extends generally parallel to the panel 24 in the region of the base part 150, and the aperture 400 extends through both the panel 22 and the panel 24 in this region.

At a second part of panel 22, in a region just inward of the distal end of the base part 150 (from which the lip 103 extends), the panel 22 curves away from the panel 24 through approximately 120°, whereafter it extends generally downwardly and eventually meets with the part of the panel 22 located within the channel 93. It should be noted that, although respective "parts" of the panel 22 are referred to, these are preferably parts of the same, integrally formed, sheet of material.

In a further modification, rather than being provided with a cosmetic lip 154 at the distal end of the base 150, the base 150 has an obliquely angled (with respect to the platform 82) slot 418 formed therein. The end of trim piece 420 is accommodated in this slot 418, which pushes apart the opposite sides of the slot 418. The material 422 on the lower side of the slot 418 may abut the second, curved part of the panel 22. The material 424 on the upper side of the slot 418 may terminate in a point which abuts the outer surface of the trim piece 420 without leaving any significant gap between the material 424 and the trim piece 420 in order to provide a sharp and visually appealing transition between these two components. The trim piece 420 may, for example, be an extension of the interior trim used within the vehicle, and may, for example, be coloured to compliment the upholstery in the interior of the vehicle.

In the FIG. 20 embodiment, the position of the cut line 162 is moved inwardly, and is closer to the cut line 160 than in FIG. 5. This allows the clip 409 to be formed in the extruded base part 150.

Figure 21:
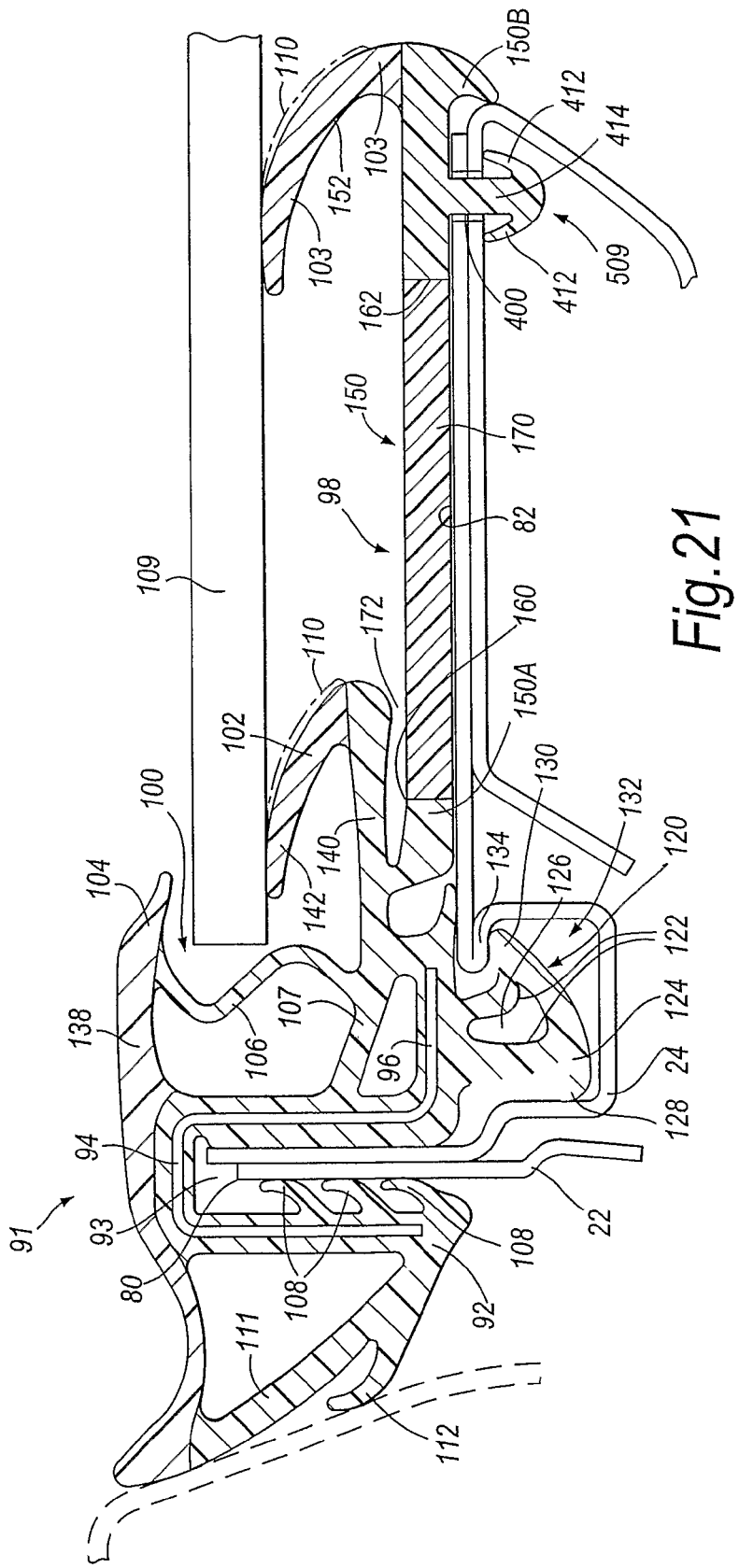
FIG. 21 shows a cross-section taken along the line VII-VII of FIG. 3 but modified in accordance with a thirteenth embodiment of the invention.

FIG. 21 shows a further embodiment of the invention in a view corresponding to that of FIG. 4. A clip 509, of similar configuration to the clip 409 of FIG. 20, is integrally formed from the outer base part 150B of extruded material of the base part 150. However, in this embodiment, no carrier corresponding to the carrier 416 of the FIG. 20 embodiment is provided. Advantageously, the outer base part 150B is harder than the material of the lips 102 and 103 (and optionally harder than the material used to form the other extruded parts of the strip 91). Forming the extruded part 150B from relatively hard material will improve the effectiveness of the clip 509 in securely locating the distal end of the base part 150 with respect to the platform 82.

The panel 22 of FIG. 21 has a similar configuration to the panel 22 of FIG. 20.

The clips 409 and 509 of FIGS. 20 and 21 may more securely locate the sealing lip 103. This may be advantageous in cold weather conditions, when the lip 103 may freeze to the window glass 109.

Figure 22:
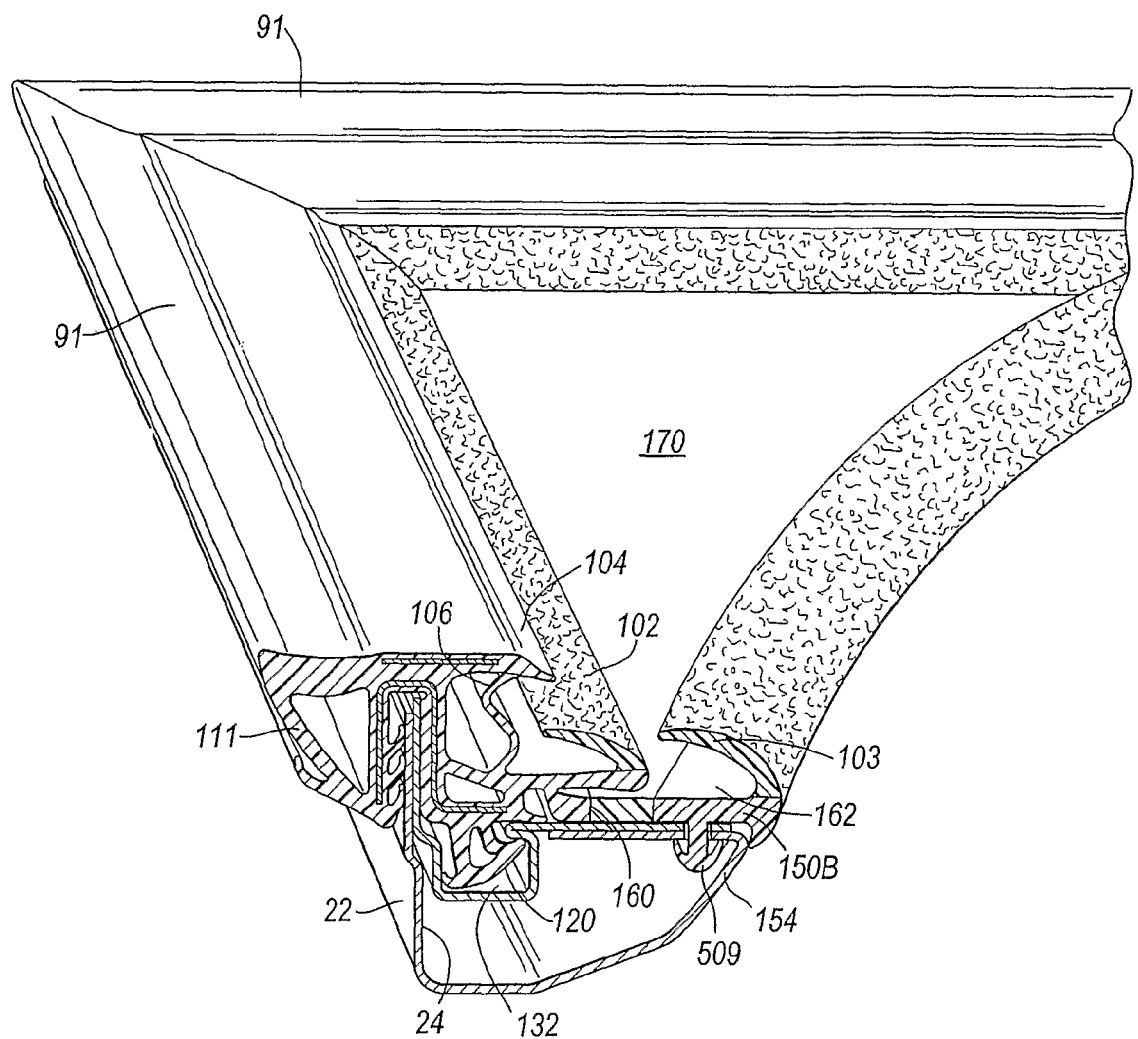
FIG. 22 shows a perspective view of a window frame and the sealing and guiding strip in accordance with the thirteenth embodiment of the invention.

FIG. 22 shows the arrangement of FIG. 21 in a perspective view corresponding to that of FIG. 3. The clip 509 (and clip 409 of FIG. 20) may extend along the entire extent of the platform 82 or may extend along only a portion thereof. A plurality of separate, spaced apart, clips 409 or 509 may be provided along the distal edge of the base part 150 for engaging respective spaced apart apertures 400 formed in the platform 82/panels 22,24.

The strip 91 is preferably fitted to the frame 8 of the vehicle door 5 by, as a first step, sliding the flange 80 (comprising the panels 22 and 24) into the channel 93 of the strip 91. At the same time, the hook-shaped part 120 will engage the channel 132 formed by the panel 24. As a second, subsequent step, the free or distal end of the strip 91 may be fitted to the platform 80 (comprising panels 22 and 24) by means of the cosmetic lip 154, clamping member 302 (FIG. 12), clip 309 (FIG. 13)

engagement surface 320, 320B/recess 322, 322B (FIGS. 14A, 14B), clip 409 (FIG. 20) and/or clip 509 (FIGS. 21 and 22).

Any of the various modifications shown in FIGS. 20, 21 and 22 may be employed in a sealing strip 91 by themselves or together with other modifications described.

As explained above, the moulded part 170 forms a flap portion which conceals the platform 82. The join or joins between the moulded material 170 and the extruded material of the strips 91 may be obscured from view by the lips 102 and/or 103. The provision of two lips 102 and 103 may tend to improve sealing, thereby reducing moisture ingress and improving sound insulation. The lips may be formed from extruded material—avoiding the need for post-flocking.

The invention claimed is:

1. A sealing or guiding assembly for sealing or guiding a corner of a closure member for an opening and for attachment to a frame for the opening, including;

strips of flexible material extending towards and meeting at an apex of the corner and shaped to receive the closure member at the corner and adapted to be supported by a corner support which forms part of the frame, and a flap of flexible material joined to the strips of flexible material in a region of the corner and bridging across the corner between the strips, wherein the strips each include a first lip extending from a proximal region of the flap and a second lip extending from an end region of the flap with the second lip bridging across the corner between the strips such that at least one of the first and second lips sealingly engages the closure member, the arrangement being such that an outer join at the end region of the flap is disposed under the second lip.

2. The assembly of claim 1, wherein an inner join at the proximal region of the flap is disposed under one of the first lips of one of the strips.

3. The assembly of claim 2, wherein two sides of the flap are joined to respective sides of the strips in the region of the corner with the sides of the flap extending toward the apex of the corner and inner joins at the sides of the flap being disposed under respective first lips of the strips.

4. The assembly of claim 3, wherein the outer join bridges across the corner between the sides of the flap such that the second lip bridges angularly across the corner with the outer join disposed under the second lip.

5. The assembly of claim 1, wherein the strips include at least one further lip for clampingly engaging the frame.

6. The assembly of claim 1, wherein the strips include a resiliently deformable protrusion for engaging a recess of the frame for serving to locate the strips with respect to the frame.

7. The assembly of claim 1, wherein the strips include a channel for grippingly engaging a flange of the frame.

8. The assembly of claim 1, wherein the flap is formed of moulded material.

9. The assembly of claim 1, wherein the flap is moulded onto the strips.

10. The assembly of claim 1, wherein the strips are formed of extruded material.

11. The assembly of claim 1, wherein at least one of the flap and the strips comprise at least one of EPDM and TPE.

12. The assembly of claim 1, wherein the flap is compressible or extendable/stretchable in order to allow it to extend over the corner support.

13. The assembly of claim 12, wherein the flap includes a reduced thickness portion to provide the compressibility or extendibility.

14. The assembly of claim 1, wherein a distal end of each of the strips have an embedded rigid member therein for reducing the tendency of the distal end to bend.

15. The assembly of claim 1, in which at least one of the flap and the strips include a formation for engaging the corner support.

16. The assembly of claim 15, wherein the formation comprises a protrusion with a resiliently deformable enlarged head portion.

17. The assembly of claim 16, in which the corner support includes an aperture with which the protrusion engages.

18. The assembly of claim 16, wherein the formation is formed from material which is harder than the flexible material forming other parts of the strips.

19. The assembly of claim 16, wherein the protrusion has a rigid member embedded therein.

20. The assembly of claim 15, wherein the formation is integrally formed with at least one of the strips.

21. The assembly of claim 15, wherein the formation is integrally formed with the flap.

22. The assembly of claim 21, wherein the formation comprises a recess.

23. The assembly of claim 22, wherein the corner support includes an engagement part for abutting a surface of the recess.

24. A sealing or guiding assembly for sealing or guiding a corner of a closure member for an opening and for attachment to a frame for the opening, including;

strips of flexible material extending towards and meeting at an apex of the corner and shaped to receive the closure member at the corner and adapted to be supported by a corner support which forms part of the frame, and a flap of flexible material having two sides joined to respective sides of the strips of flexible material in a region of the corner with the flap bridging across the corner between the strips, wherein the strips include a first lip extending towards the apex of the corner and a second lip extending from an end region of the flap of flexible material that bridges across the corner between the strips such that the second lip is spaced from the apex of the corner, the first and second lips being for sealingly engaging the closure member with an outer join at the end region of the flap being disposed under the second lip.

25. A sealing or guiding assembly for sealing or guiding a corner of a closure member for an opening and for attachment to a frame for the opening, including;

strips of flexible material extending towards and meeting at an apex of the corner and shaped to receive the closure member at the corner and adapted to be supported by a corner support which forms part of the frame, and a flap of flexible material having two sides joined to respective sides of the strips of flexible material in a region of the corner with the flap bridging across the corner between the strips, wherein the strips include a first lip extending towards the apex of the corner and a second lip extending from an end region of the flap of flexible material that bridges across the corner between the strips for sealingly engaging the closure member with inner joins at the sides of the flap being disposed under respective first lips of the strips and an outer join at the end region of the flap being disposed under the second lip with the outer join bridging across the corner between the sides of the flap.

* * * * *